(12) United States Patent
Wang et al.

(10) Patent No.: US 10,557,925 B2
(45) Date of Patent: Feb. 11, 2020

(54) TIME-OF-FLIGHT (TOF) IMAGE SENSOR USING AMPLITUDE MODULATION FOR RANGE MEASUREMENT

(71) Applicant: Samsung Electronics Co., Ltd., Suwon-si, Gyeonggi-do (KR)

(72) Inventors: Yibing Michelle Wang, Temple City, CA (US); Tae-Yon Lee, Hwaseong-si (KR); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 679 days.

(21) Appl. No.: 15/340,972

(22) Filed: Nov. 1, 2016

(65) Prior Publication Data

US 2018/0059224 A1    Mar. 1, 2018

Related U.S. Application Data

(60) Provisional application No. 62/380,351, filed on Aug. 26, 2016.

(51) Int. Cl.
*G01C 3/08*     (2006.01)
*G01S 7/486*    (2006.01)
(Continued)

(52) U.S. Cl.
CPC .......... *G01S 7/4863* (2013.01); *G01S 7/4865* (2013.01); *G01S 7/4868* (2013.01); *G01S 17/10* (2013.01); *G01S 17/89* (2013.01)

(58) Field of Classification Search
CPC .... G01S 7/4863; G01S 7/4868; G01S 7/4865; G01S 7/89; G01S 7/10
(Continued)

(56) References Cited

U.S. PATENT DOCUMENTS 8,395,968 B2    3/2013   Vartanian et al.
8,902,411 B2   12/2014   Park et al.
(Continued)

OTHER PUBLICATIONS

Conroy, Richard M., et al., "A Power-Saving Modulation Technique for Time-of-Flight Range Imaging Sensors," Proceedings of SPIE, vol. 8085, Videometrics, Range Imaging, and Applications XI, 808506 (2011); doi:10.1117/12.889729, Located via Google Scholar, 13 pages.

*Primary Examiner* — Mark Hellner
(74) *Attorney, Agent, or Firm* — Renaissance IP Law Group LLP

(57) ABSTRACT

The Time-of-Flight (TOF) technique is combined with analog amplitude modulation within each pixel in an image sensor. The pixel may be a two-tap pixel or a one-tap pixel. Two photoelectron receiver circuits in the pixel receive respective analog modulating signals. The distribution of the received photoelectron charge between these two circuits is controlled by the difference (or ratio) of the two analog modulating voltages. The differential signals generated in this manner within the pixel are modulated in time domain for TOF measurement. Thus, the TOF information is added to the received light signal by the analog domain-based single-ended to differential converter inside the pixel itself. The TOF-based measurement of range and its resolution are controllable by changing the duration of modulation. An autonomous navigation system with these features may provide improved vision for drivers under difficult driving conditions like low light, fog, bad weather, or strong ambient light.

10 Claims, 7 Drawing Sheets

(51) Int. Cl.
  *G01S 17/10* (2006.01)
  *G01S 17/89* (2006.01)
(58) Field of Classification Search
  USPC .......................................................... 356/5.01
  See application file for complete search history.

(56) References Cited

U.S. PATENT DOCUMENTS

| | | |
|---|---|---|
| 9,052,395 B2 | 6/2015 | Conroy et al. |
| 2012/0274744 A1* | 11/2012 | Wan .................. H04N 5/37452 |
| | | 348/46 |
| 2014/0002636 A1 | 1/2014 | Lee et al. |
| 2016/0065942 A1 | 3/2016 | Park |
| 2019/0104296 A1* | 4/2019 | Kovacovsky ........... G01S 17/46 |

* cited by examiner

TIME-OF-FLIGHT (TOF) IMAGE SENSOR USING AMPLITUDE MODULATION FOR RANGE MEASUREMENT

CROSS-REFERENCE TO RELATED APPLICATION

This application claims the priority benefit under 35 U.S.C. § 119(e) of U.S. Provisional Application No. 62/380,351 filed on Aug. 26, 2016, the disclosure of which is incorporated herein by reference in its entirety.

TECHNICAL FIELD

The present disclosure generally relates to image sensors. More specifically, and not by way of limitation, particular embodiments of the inventive aspects disclosed in the present disclosure are directed to modulating light-sensing photogates of pixels in a Time-of-Flight (TOF) image sensor in the analog domain and using a specific ratio of the resulting differential outputs from each pixel to calculate TOF values and range of a three-dimensional (3D) object.

BACKGROUND

Three-dimensional (3D) imaging systems are increasingly being used in a wide variety of applications such as, for example, industrial production, video games, computer graphics, robotic surgeries, consumer displays, surveillance videos, 3D modeling, real estate sales, autonomous navigation, and so on.

Existing 3D imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. The outputs of pixels in the camera provide information about pixel-specific TOF values to generate a 3D depth profile of the object. A TOF camera may use a scannerless approach to capture the entire scene with each laser or light pulse. In a direct TOF imager, a single laser pulse may be used to capture spatial and temporal data to record a 3D scene. This allows rapid acquisition and rapid real-time processing of scene information. Some example applications of the TOF method may include advanced automotive applications such as autonomous navigation and active pedestrian safety or pre-crash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras—displaced horizontally from one another—are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may get deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging may be used in different applications such as, for example, by a police force to photograph fingerprints in a 3D scene, inline inspection of components during a production process, in health care for live measurements of human body shapes or the micro structures of human skin, and the like.

SUMMARY

In one embodiment, the present disclosure is directed to a method that comprises: (i) projecting a laser pulse onto a three-dimensional (3D) object; (ii) applying a first analog modulating signal to a first photoelectron receiver and a second analog modulating signal to a second photoelectron receiver in a pixel, and wherein the second analog modulating signal is an inverse of the first analog modulating signal; (iii) detecting a returned pulse using the first and the second photoelectron receivers, wherein the returned pulse is the projected pulse reflected from the 3D object; (iv) generating a pair of signal values in response to photoelectron receiver-specific detections of the returned pulse, wherein the pair of signal values includes a first signal value and a second signal value, and wherein each of the first and the second signal values is based on modulation received from a respective one of the first and the second analog modulating signals; and (v) determining a Time of Flight (TOF) value of the returned pulse using a ratio of the first signal value to a total of the first and the second signal values.

In another embodiment, the present disclosure is directed to a pixel in an image sensor. The pixel comprises: (i) a charge generation portion that includes a first circuit and a second circuit to convert incident light into respective electrical signals, wherein the first circuit is configured to receive a first analog modulating signal and the second circuit is configured to receive a second analog modulating signal, and wherein the first and the second circuits are configured to generate respective electrical signals in presence of the first and the second analog modulating signals; (ii) a signal collection portion connected to the charge generation portion and configured to receive an electronic shutter input, wherein the signal collection portion is operable to receive the electrical signals generated by the charge generation portion under control of the electronic shutter input; and (iii) a signal transfer portion connected to the signal collection portion and configured to receive a plurality of external inputs, wherein the signal transfer portion is operable to transfer the electrical signals as a pixel output in response to the plurality of external inputs.

In a further embodiment, the present disclosure is directed to an imaging unit that comprises a light source and an image sensor unit. The light source is operative to project a laser pulse onto a 3D object. The image sensor unit includes:

(i) a plurality of pixels arranged in a two-dimensional (2D) pixel array, wherein each pixel in at least one row of pixels in the 2D pixel array includes a pixel-specific first circuit configured to receive a first analog modulating signal and a pixel-specific second circuit configured to receive a second analog modulating signal that is an inverse of the first analog modulating signal, and wherein each pixel in the row of pixels is operative to detect a returned pulse resulting from reflection of the projected pulse by the 3D object using the pixel-specific first and second circuits and generate a pixel-specific output based on modulation received by the first and the second analog modulating signals; (ii) a plurality of Analog-to-Digital Converter (ADC) units, wherein each ADC unit is associated with a respective pixel in the row of pixels and is operative to generate a pixel-specific pair of signal values based on the pixel-specific output, wherein the pixel-specific pair of signal values includes a pixel-specific first signal value and a pixel-specific second signal value; and (iii) a processing unit coupled to the plurality of ADC units and the 2D pixel array, wherein the processing unit is operative to provide the first and the second analog modulating signals to each pixel in the row of pixels, and wherein the processing unit is further operative to receive each pixel-specific pair of signal values and determine a corresponding pixel-specific TOF value of the returned pulse using the pixel-specific first signal value and the pixel-specific second signal value.

In yet another embodiment, the present disclosure is directed to a system, which comprises: (i) a light source; (ii) a plurality of pixels; (iii) a plurality of ADC units; (iv) a memory for storing program instructions; and (v) a processor coupled to the memory, the plurality of ADC units, and the plurality of pixels. In the system, the light source projects a laser pulse onto a 3D object. In the plurality of pixels, each pixel includes a respective first circuit configured to receive a first analog modulating signal and a respective second circuit configured to receive a second analog modulating signal that is an inverse of the first analog modulating signal. Each pixel uses respective first and second circuits to detect a returned pulse resulting from reflection of the projected pulse by the 3D object and generates a pixel-specific output based on modulation received by the first and the second analog modulating signals. In the plurality of ADC units, each ADC unit is associated with a respective pixel in the plurality of pixels and is operative to generate a pixel-specific pair of signal values in response to pixel-specific detection of the returned pulse. The pixel-specific pair of signal values includes a pixel-specific first signal value and a pixel-specific second signal value. In the system, the processor is configured to execute the program instructions, whereby the processor is operative to perform the following: (a) facilitate delivery of the first and the second analog modulating signals to each pixel, (b) receive each pixel-specific pair of signal values and determine a corresponding pixel-specific TOF value of the returned pulse using the pixel-specific first signal value and the pixel-specific second signal value, and (c) for each pixel in the plurality of pixels, determine a pixel-specific distance to the 3D object based on the pixel-specific TOF value.

BRIEF DESCRIPTION OF THE DRAWINGS

In the following section, the inventive aspects of the present disclosure will be described with reference to exemplary embodiments illustrated in the figures, in which.

DETAILED DESCRIPTION

Figure 1:
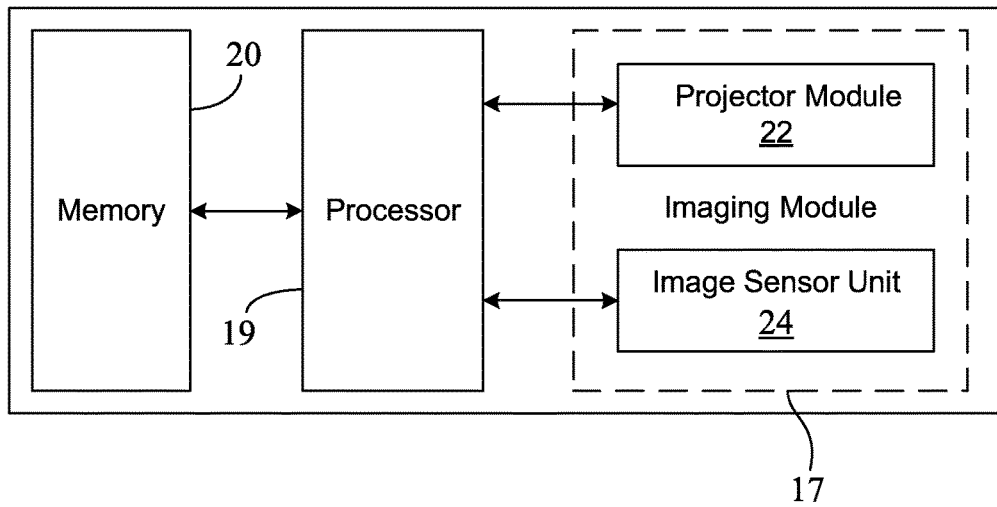
FIG. 1 shows a highly simplified, partial layout of a TOF imaging system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to perform low power, range measurements and 3D imaging in any imaging device or system, including, for example, a computer, an automobile navigation system, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "three-dimensional," "pre-determined", "pixel-specific," etc.) may be occasionally interchangeably used with its non-hyphenated version (e.g., "three dimensional," "predetermined", "pixel specific," etc.), and a capitalized entry (e.g., "Projector Module," "Image Sensor," "PIXOUT" or "Pixout," etc.) may be interchangeably used with its non-capitalized version (e.g., "projector module," "image sensor," "pixout," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure.

It is observed here that the earlier-mentioned 3D technologies have many drawbacks. For example, a range gated TOF imager may use multiple laser pulses to provide illumination and an optical gate to allow the light to reach the imager only during a desired time period. The range gated TOF imagers can be used in two-dimensional (2D) imaging to suppress anything outside a specified distance range, such as to see through fog. However, the gated TOF imagers may provide only Black-and-White (B&W) output and may not have 3D imaging capability. Furthermore, current TOF systems typically operate over a range of few meters to several tens of meters, but their resolution may decrease for measurements over short distances, thereby making 3D imaging within a short distance—such as, for example, in a fog or hard-to-see conditions—almost impractical. Also, pixels in existing TOF sensors may be vulnerable to ambient light.

The stereoscopic imaging approach generally works only with textured surfaces. It has high computational complexity because of the need to match features and find correspondences between the stereo pair of images of an object. This requires high system power. Furthermore, stereo imaging requires two regular, high bit resolution sensors along with two lenses, making the entire assembly unsuitable where space is at a premium such as, for example, in an automobile-based autonomous navigation system. Additionally, stereo 3D cameras have difficulty to see through fog and to deal with motion blur.

In contrast, particular embodiments of the present disclosure provide for implementing a TOF-based 3D imaging system, for example, on automotives for all weather conditions. Thus, improved vision for drivers may be provided under difficult conditions such as, for example, low light, bad weather, fog, strong ambient light, and the like. As discussed in more detail below, in a single pulse-based direct TOF system as per particular embodiments of the present disclosure, the TOF information is added to the received signal by the analog domain-based single-ended to differential converter inside the pixel itself. Thus, the present disclosure provides for a single chip solution that directly combines TOF and analog Amplitude Modulation (AM) within each pixel in the pixel array. As a result, an improved autonomous navigation system may be offered that can "see through" inclement weather at short range and produce 3D images as well as 2D gray-scale images substantially independent of the ambient light.

FIG. 1 shows a highly simplified, partial layout of a TOF imaging system 15 according to one embodiment of the present disclosure. As shown, the system 15 may include an imaging module 17 coupled to and in communication with a processor or host 19. The system 15 may also include a memory module 20 coupled to the processor 19 to store information content such as, for example, image data received from the imaging module 17. In particular embodiments, the entire system 15 may be encapsulated in a single Integrated Circuit (IC) or chip. Alternatively, each of the modules 17, 19, and 20 may be implemented in a separate chip. Furthermore, the memory module 20 may include more than one memory chip, and the processor module 19 may comprise of multiple processing chips as well. In any event, the details about packaging of the modules in FIG. 1 and how they are fabricated or implemented—in a single chip or using multiple discrete chips—are not relevant to the present discussion and, hence, such details are not provided herein.

The system 15 may be any electronic device configured for 2D and 3D imaging applications as per teachings of the present disclosure. The system 15 may be portable or non-portable. Some examples of the portable version of the system 15 may include popular consumer electronic gadgets such as, for example, a mobile device, a cellphone, a smartphone, a User Equipment (UE), a tablet, a digital camera, a laptop or desktop computer, an automobile navigation unit, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile with autonomous navigation capability, a machine vision system, an industrial robot, a VR equipment, and so on. The 3D imaging functionality provided as per teachings of the present disclosure may be used in many applications such as, for example, automobile applications such as all-weather autonomous navigation and driver assistance in low light or inclement weather conditions, human-machine interface and gaming applications, machine vision and robotics applications, and the like.

In particular embodiments of the present disclosure, the imaging module 17 may include a projector module (or light source module) 22 and an image sensor unit 24. As discussed in more detail with reference to FIG. 2 below, in one embodiment, the light source in the projector module 22 may be an Infrared (IR) laser such as, for example, a Near Infrared (NIR) or a Short Wave Infrared (SWIR) laser, to make the illumination unobtrusive. In other embodiments, the light source may be a visible light laser. The image sensor unit 24 may include a pixel array and ancillary processing circuits as shown in FIG. 2 and also discussed below.

In one embodiment, the processor 19 may be a Central Processing Unit (CPU), which can be a general purpose microprocessor. In the discussion herein, the terms "processor" and "CPU" may be used interchangeably for ease of discussion. However, it is understood that, instead of or in addition to the CPU, the processor 19 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In particular embodiments, the memory module 20 may be a Dynamic Random Access Memory (DRAM) such as, for example, a Synchronous DRAM (SDRAM), or a DRAM-based Three Dimensional Stack (3DS) memory module such as, for example, a High Bandwidth Memory (HBM) module, or a Hybrid Memory Cube (HMC) memory module. In other embodiments, the memory module 20 may be a Solid State Drive (SSD), a non-3DS DRAM module, or any other semiconductor-based storage system such as, for example, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
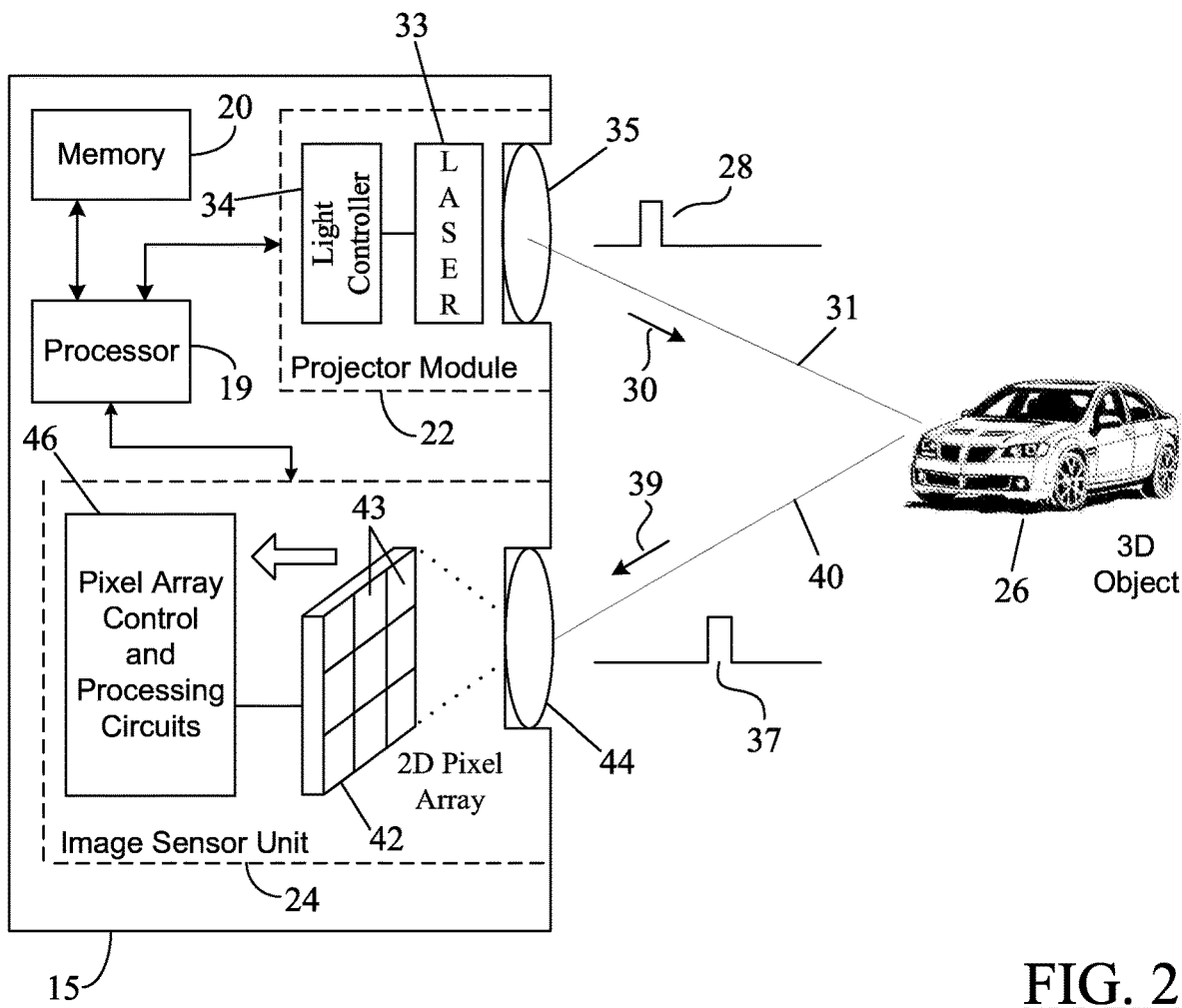
FIG. 2 illustrates an exemplary operational layout of the system in FIG. 1 according to one embodiment of the present disclosure.

FIG. 2 illustrates an exemplary operational layout of the system 15 in FIG. 1 according to one embodiment of the present disclosure. The system 15 may be used to obtain range measurements (and, consequently, a 3D image) for a 3D object, such as the 3D object 26, which may be an individual object or an object within a group of other objects. In one embodiment, the range and 3D depth information may be calculated by the processor 19 based on the measurement data received from the image sensor unit 24. In another embodiment, the range/depth information may be calculated by the image sensor unit 24 itself. In particular embodiments, the range information may be used by the processor 19 as part of a 3D user interface to enable the user of the system 15 to interact with the 3D image of the object or use the 3D image of the object as part of games or other applications—like an autonomous navigation application—running on the system 15. The 3D imaging as per teachings of the present disclosure may be used for other purposes or applications as well, and may be applied to substantially any 3D object, whether stationary or in motion.

The light source (or projector) module 22 may illuminate the 3D object 26 by projecting a short pulse 28 as shown by an exemplary arrow 30 associated with a corresponding dotted line 31 representing an illumination path of a light signal or optical radiation that may be used to project on the 3D object 26 within an optical Field Of View (FOV). The system 15 may be a direct TOF imager in which a single pulse may be used per image frame (of pixel array). In certain embodiments, multiple, short pulses may be transmitted onto the 3D object 26 as well. An optical radiation source, which, in one embodiment, may be a laser light source 33 operated and controlled by a laser controller 34, may be used to project the short pulse 28 onto the 3D object 26. The pulse 28 from the laser source 33 may be projected—under the control of the laser controller 34—onto the surface of the 3D object 26 via projection optics 35. The projection optics may be a focusing lens, a glass/plastics surface, or other cylindrical optical element. In the embodiment of FIG. 2, a convex structure is shown as a focusing lens 35. However, any other suitable lens design or an external optical cover may be selected for projection optics 35.

In particular embodiments, the light source (or illumination source) 33 may be a diode laser or a Light Emitting Diode (LED) emitting visible light, a light source that produces light in the non-visible spectrum, an IR laser (for example, an NIR or an SWIR laser), a point light source, a monochromatic illumination source (such as, for example, a combination of a white lamp and a monochromator) in the visible light spectrum, or any other type of laser light source. In autonomous navigation applications, the more unobtrusive NIR or SWIR laser may be preferred as the pulsed laser light source 33. In certain embodiments, the light source 33 may be one of many different types of laser light sources such as, for example, a point source with 2D scanning capability, a sheet source with one-dimensional (1D) scanning capability, or a diffused laser with matching FOV of the sensor unit 24. In particular embodiments, the laser 33 may be fixed in one position within the housing of the device 15, but may be rotatable in X-Y directions. The laser 33 may be X-Y addressable (for example, by the laser controller 34) to perform a scan of the 3D object 26. The laser pulse 28 may be projected onto the surface of the 3D object 26 using a mirror (not shown), or the projection may be completely mirror-less. In particular embodiments, the light source module 22 may include more or less components than those shown in the exemplary embodiment of FIG. 2.

In the embodiment of FIG. 2, the light/pulse 37 reflected from the object 26 may travel along a collection path indicated by an arrows 39 and a dotted line 40. The light collection path may carry photons reflected from or scattered by the surface of the object 26 upon receiving illumination from the laser source 33. It is noted here that the depiction of various propagation paths using solid arrows and dotted lines in FIG. 2 is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

In TOF imaging, the light received from the illuminated object 26 may be focused onto a 2D pixel array 42 via collection optics 44 in the image sensor unit 24. The pixel array 42 may include one or more pixels 43. Like the projection optics 35, the collection optics 44 may be a focusing lens, a glass/plastics surface, or other cylindrical optical element that concentrates the reflected light received from the object 26 onto one or more pixels 43 in the 2D array 42. An optical band-pass filter (not shown) may be used as part of the collection optics 44 to pass only the light with the same wavelength as the wavelength of light in the illumination pulse 28. This may help suppress collection/reception of non-relevant light and reduce noise. In the embodiment of FIG. 2, a convex structure is shown as a focusing lens 44. However, any other suitable lens design or optical covering may be selected for collection optics 44. Furthermore, for ease of illustration, only a 3×3 pixel array is shown in FIG.

Figure 5:
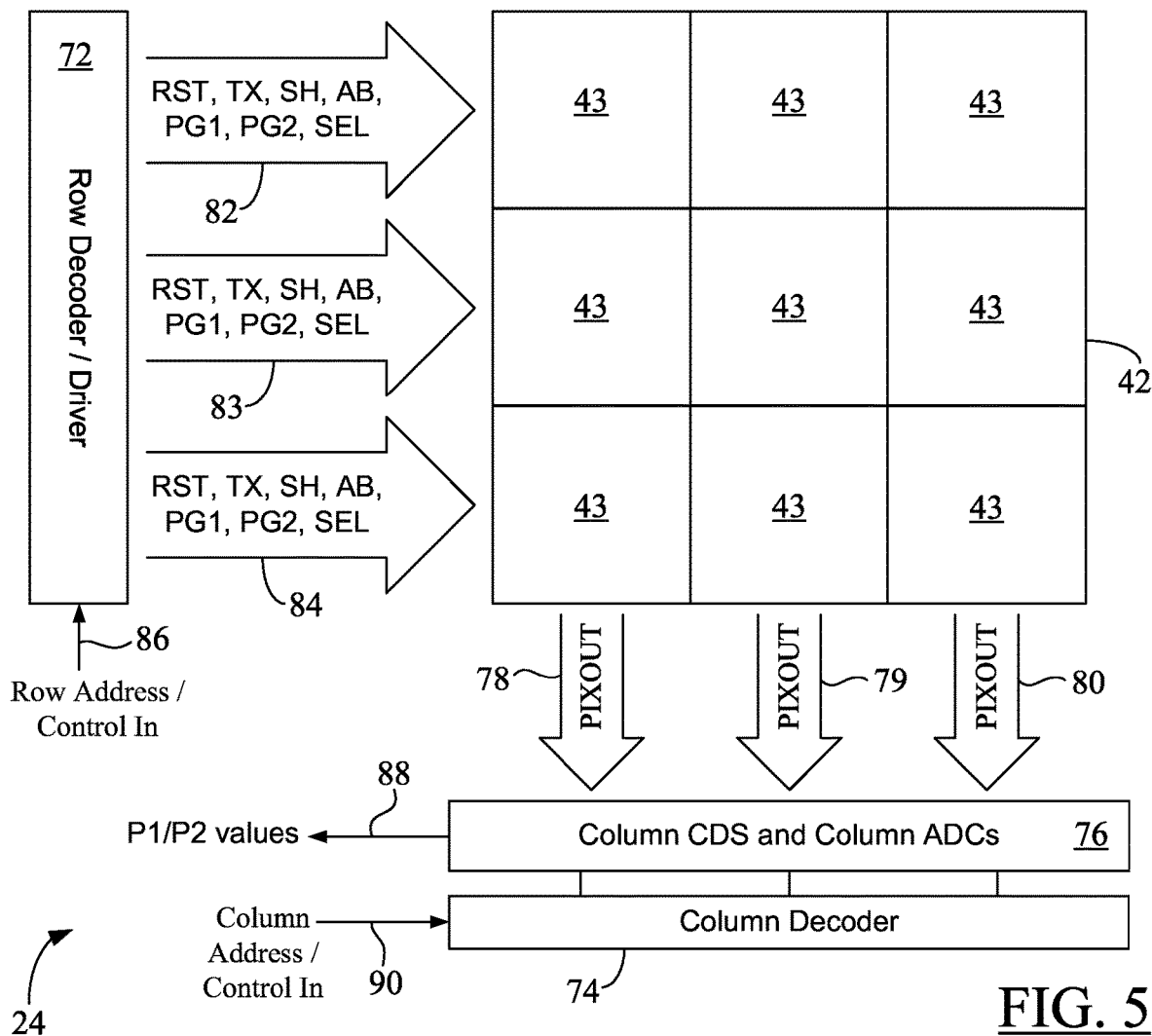
FIG. 5 is an exemplary layout of a portion of an image sensor unit according to one embodiment of the present disclosure.

2 (and also in FIG. 5). However, it is understood that, modern pixel arrays contain thousands or even millions of pixels.

The TOF-based 3D imaging as per particular embodiments of the present disclosure may be performed using many different combinations of 2D pixel arrays 42 and laser light sources 33 such as, for example: (i) a 2D color (RGB) sensor with a visible light laser source, in which the laser source may be a red (R), green (G), or blue (B) light laser, or a laser source producing a combination of these lights; (ii) a visible light laser with a 2D RGB color sensor having an Infrared (IR) cut filter; (iii) an NIR or SWIR laser with a 2D IR sensor; (iv) an NIR laser with a 2D NIR sensor; (v) an NIR laser with a 2D RGB sensor (without an IR cut filter); (vi) an NIR laser with a 2D RGB sensor (without an NIR cut filter); (vii) a 2D RGB-IR sensor with visible or IR laser; (viii) a 2D RGBW (red, green, blue, white) or RWB (red, white, blue) sensor with either visible or NIR laser; and so on. In case of an NIR or other IR laser as, for example, in autonomous navigation applications, the 2D pixel array 42 may provide outputs to generate a grayscale image of the object 26. These pixel outputs also may be processed to obtain the range measurements and, hence, to generate a 3D image of the object 26, as discussed in more detail below. Additional architectural details of the image sensor unit 24 are discussed later with reference to FIG. 5, whereas exemplary circuit details of individual pixels 43 are shown and discussed later with reference to FIGS. 6 and 8.

The pixel array 42 may convert the received photons into corresponding electrical signals, which are then processed by the associated image processing unit 46 to determine the range and 3D depth image of the object 26. In one embodiment, the image processing unit 46 and/or the processor 19 may carry out range measurements as explained with reference to FIG. 3 below. The image processing unit 46 may also include relevant circuits for controlling the operation of the pixel array 42. Exemplary image processing and control circuits are illustrated in FIG. 5, which is discussed later below. It is noted here that both the illumination unit 22 and the pixel array 42 may have to be controlled by high speed signals and synchronized. These signals have to be very accurate to obtain a high resolution. Hence, the processor 19 and the image processing unit 46 may be configured to provide relevant signals with accurate timing and high precision.

In the TOF system 15 in the embodiment of FIG. 2, the pixel array processing circuit 46 may receive a pair of pixel-specific outputs from each pixel 43 to measure the pixel-specific time (pixel-specific TOF value) the light has taken to travel from the illumination unit 22 to the object 26 and back to the pixel array 42. The timing calculation may use the approach discussed below with reference to FIG. 3. Based on the calculated TOF values, in certain embodiments, the pixel-specific distance to the object 26 may be calculated by the image processing unit 46 directly in the image sensor unit 24 to enable the processor 19 to provide a 3D distance image of the object 26 over some interface—such as, for example, a display screen or user interface.

The processor 19 may control the operations of the projector module 22 and the image sensor unit 24. Upon user input or automatically (as, for example, in a real-time autonomous navigation application), the processor 19 may repeatedly send a laser pulse 28 onto the surrounding 3D object(s) 26 and trigger the sensor unit 24 to receive and process incoming light signals 37. The processed image data received from the image processing unit 46 may be stored by the processor 19 in the memory 20 for TOF-based range computation and 3D image generation (if applicable). The processor 19 may also display a 2D image (for example, a grayscale image) and/or a 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of its functions. In particular embodiments, the memory 20 may store program code, look-up tables, and/or interim computational results to enable the processor 19 to carry out its functions.

Figure 3:
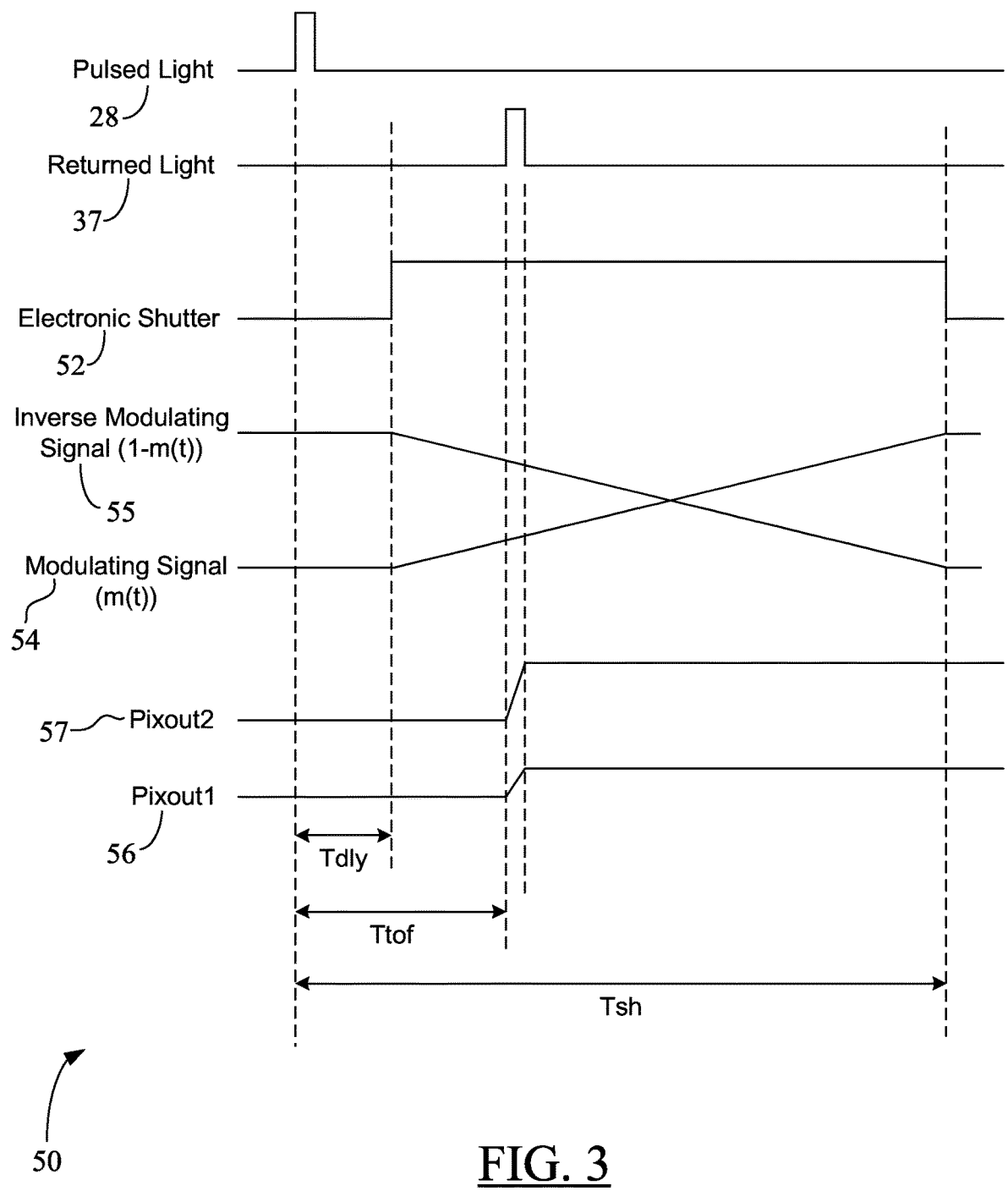
FIG. 3 is a timing diagram that shows exemplary timing of different signals in the system of FIGS. 1-2 for measuring a TOF value according to one embodiment of the present disclosure.

FIG. 3 is a timing diagram 50 that shows exemplary timing of different signals in the system 15 of FIGS. 1-2 for measuring a TOF value according to one embodiment of the present disclosure. As noted before, the waveforms shown in FIG. 3 (and also in FIGS. 7 and 9) are simplified in nature and are for illustrative purpose only; the actual waveforms may differ in timing as well as shape depending on the circuit implementation. As shown in FIG. 3, the returned pulse 37 may be a time-wise delayed version of the projected pulse 28. In particular embodiments, the projected pulse 28 may be of a very short duration such as, for example, in the range of 5 to 10 nanoseconds (ns). The returned pulse 37 may be sensed using the pixels 43 in the pixel array 42. An electronic shutter signal 52 may be provided to each pixel (as discussed later with reference to the embodiments in FIGS. 6 and 8) to enable the pixel to capture the pixel-specific photoelectrons in the received light 37. The shutter signal 52 may have a gated delay—with reference to the projected pulse 28—to avoid the light scatters from reaching the pixel array 42. The light scatters of the projected pulse 28 may occur, for example, due to an inclement weather. The shutter delay is identified using the parameter "$T_{dly}$" in FIG. 3. In some embodiments, the delay "$T_{dly}$" may be pre-determined and fixed regardless of operating conditions. In other embodiments, the shutter delay "$T_{dly}$" may be adjustable at run-time depending on, for example, the external weather condition.

In particular embodiments of the present disclosure, while the shutter signal 52 is active, a pair of time-varying analog modulating signals 54-55 may be applied to each pixel 43, as discussed in more detail later with reference to the embodiments in FIGS. 6 and 8. In certain embodiments, the modulating function may be monotonic. Each pixel may have two photoelectron collection sites, each of which may provide a respective output. In the illustration of FIG. 3, the two pixel-specific outputs—resulting from the two collection sites—are shown as a Pixel Output-1 (Pixout1) signal 56 and a Pixel Output-2 (Pixout2) signal 57. For ease of illustration and for the sake of discussion, the pixel outputs 56-57 are shown to be substantially-aligned with the returned pulse 37. However, in practice, that may not be the case—as can be evident from the delayed versions of these waveforms in the exemplary embodiments of FIGS. 7 and 9. When the returned light pulse 37 is received by a pixel, the photoelectrons collected by each collection site in the pixel are based on the modulation signal levels of the analog modulating signals 54-55. In other words, the charge distribution to the photoelectron collection sites is controlled by the difference of the two modulating voltages 54-55. Thus, the returned signal 37 may be considered to be "differentiated" by the ratio of the two modulating voltages 54-55 and, hence, the pixel-specific outputs 56-57 may be considered as a pair of differential signals with amplitudes modulated over time by the analog modulating voltages 54-55. In this manner, a pixel 43 as per particular embodiments of the present disclosure may perform as a single-ended to differential converter that provides TOF information through Amplitude Modulation (AM) of the pixel-specific outputs 56-57 using respective analog modulating signals 54-55. In particular embodiments of the present disclosure, each analog signal 54-55 in the pair may be an inverse of the other signal. Thus, one modulating signal 54 in FIG. 3 is represented as a function "m(t)", whereas the other modulating signal is represented as the function "1−m(t)." As noted before, in particular embodiments, the modulating function "m(t)" may be monotonic. In the exemplary embodiments of FIGS. 3, 7, and 9, the analog modulating signals may be generated using a ramp function and, hence, they are shown as having ramp-type waveforms. However, in other embodiments, different types of analog waveforms/functions—preferably in an inverse pair—may be used as modulating signals 54-55.

In the context of FIG. 3, it is seen that the parameter "$T_{dly}$" refers to the time delay between the rising edges of the projected pulse 28 and the electronic shutter signal 52, the parameter "$T_{tof}$" refers to the pixel-specific TOF value as measured by the delay between the rising edges of the projected pulse 28 and the received pulse 37; and the parameter "$T_{sh}$" refers to the time period between the transmission of the projected pulse 28 (as represented by the rising edge of the pulse 28) and the "closing" of the electronic shutter—as given by the de-assertion or de-activation of the shutter signal 52. It is observed that the ratio of one pixel output (for example, Pixout1) to the total of the two pixel outputs (here, Pixout1+Pixout2) may be proportional to the time difference of $T_{tof}$ and $T_{dly}$ values. This relation may be represented by the following equation:

$$\frac{Pixout1}{Pixout1 + Pixout2} \propto (T_{tof} - T_{dly}) \quad (1)$$

For ease of reference, the term "P1" is used to refer to "Pixout1" and the term "P2" is used to refer to "Pixout2" in the discussion below. It is seen from the relationship in equation (1) that the pixel-specific TOF value may be determined as a ratio of the pixel-specific output values P1 and P2. In certain embodiments, once the pixel-specific TOF value is so determined, the pixel-specific distance ("D") or range ("R") to an object (such as the 3D object 26 in FIG. 2) or a specific location on the object may be given by:

$$D = T_{tof} * \frac{c}{2} \quad (2)$$

where the parameter "c" refers to the speed of light. Alternatively, in some other embodiments where the modulating function "m(t)" is linear inside a shutter window, the range/distance may be computed as:

$$D = \frac{c}{2} * \left( \frac{P_1}{P_1 + P_2} + T_{dly} \right) \quad (3)$$

Consequently, a 3D image of the object—such as the object 26—may be generated by the TOF system 15 based on the pixel-specific range values determined as given above.

A brief mathematical outline is now provided to illustrate how the ratio P1/(P1+P2) in equations (1) and (3) above may be controlled by the amplitude modulating functions 54-55. Representing ambient light as the time-varying parameter "Am(t)" and the returned light signal as "r(t)", the following values may be given for P1 and P2:

$$P1 = [m(t) * r(t)] + \int_{T_{dly}}^{T_{sh}} m(t) * Am(t) \quad (4)$$

$$P2 = [(1 - m(t)) * r(t)] + \int_{T_{dly}}^{T_{sh}} (1 - m(t)) * Am(t) \quad (5)$$

$$\text{Thus, } P1 + P2 = r(t) + Am(t)_{tot} \quad (6)$$

where, the parameter "$Am(t)_{tot}$" refers to the total ambient light received by the pixel—modulated and integrated as given in equations (4) and (5) above. If the value of the parameter "$Am(t)_{tot}$" is small enough—for example, if the ambient light is minimized through optical filtering and short integration in equations (4) and (5) above, or is effectively "canceled" using a "black frame"—then the parameter "Am(t)" in equations (4) and (5) may be substantially equal to zero (Am(t)≈0). A black frame (also known as the "dark frame") is the image captured with the sensor in the dark—essentially just an image of the noise in the sensor. A black frame, or an average of several black frames, can then be subtracted from subsequent images to correct for fixed-pattern noise, such as that caused by dark current, in an image. Thus, if Am(t)≈0, the equations (4) and (5) may be solved to provide the following value for m(t):

$$m(t) = \frac{P1}{P1 + P2} \quad (7)$$

From the equation (7), the modulation time/duration "t" may be given by:

$$t = T_{tof} - T_{dly} = m^{-1}\left(\frac{P1}{P1 + P2}\right) \quad (8)$$

The above equation (8) is a more specific version of the general equation (1). It is observed that the modulation aspect is evident in equation (8)—as part of the inverse of the modulating function m(t). Thus, the pixel-specific TOF value ("$T_{tof}$") in equation (8) may be determined from the amplitude-modulated pixel outputs P1 and P2. Furthermore, it is observed here that the analog modulation—using the modulating function m(t)—may not only affect the range determination as given above, but may also allow for adjustments to the range resolution. For example, if the "active" duration of the modulating signals 54-55 is reduced—such as, for example, by reducing the active duration of the shutter signal 52, especially when the modulating signals 54-55 are synchronized with the shutter signal 52—then the value of the ratio on the right side in equation (7) may reduce as well, which, in turn, may decrease the value of the range that can be measured—as can be seen from equations (2) and (3). The shorter the range that can be effectively measured, the higher will the resolution of the TOF system 15. Furthermore, if the integration time is reduced, the ambient light may be greatly controlled so as to not allow it to influence the collected charge. This, in turn, reduces errors in the range measurements, thereby making them more robust.

Thus, as per teachings of particular embodiments of the present disclosure, the analog modulation signals 54-55 are applied to a pixel itself, as opposed to externally-manipulating the polarization of the received signal 37 before the signal is sent to the pixel array and then using the pixel outputs to obtain the ratio P1/(P1+P2). Furthermore, if digital modulation is employed, then multiple cycles of light projection may be needed to accumulate sufficient charge to be able to calculate the phase difference between the projected and the received light pulses to obtain a TOF value. In view of the present disclosure's analog modulation-based manipulation or control of the received photoelectrons inside a pixel itself, the charge distribution within the pixel is better controlled and, hence, range measurement and resolution are also controllable. The pixel-level analog amplitude modulation of the collected charge may work with an electronic shutter that may be a rolling shutter as, for example, in a Complementary Metal Oxide Semiconductor (CMOS) image sensor, or a global shutter as, for example, in a Charge Coupled Device (CCD) image sensor. The modulation approach discussed herein also may work with an epipolar plane-based imaging technique. Furthermore, although the disclosure herein is primarily provided in the context of a one-pulse TOF imaging system with 2-tap (or one-tap) pixels, like the system 15 in FIGS. 1-2, the principles of pixel-level internal analog modulation approach discussed herein may be implemented, with suitable modifications (if needed), in a continuous wave modulation TOF imaging system or a non-TOF system as well with 2-tap pixels or different pixel types.

Figure 4:
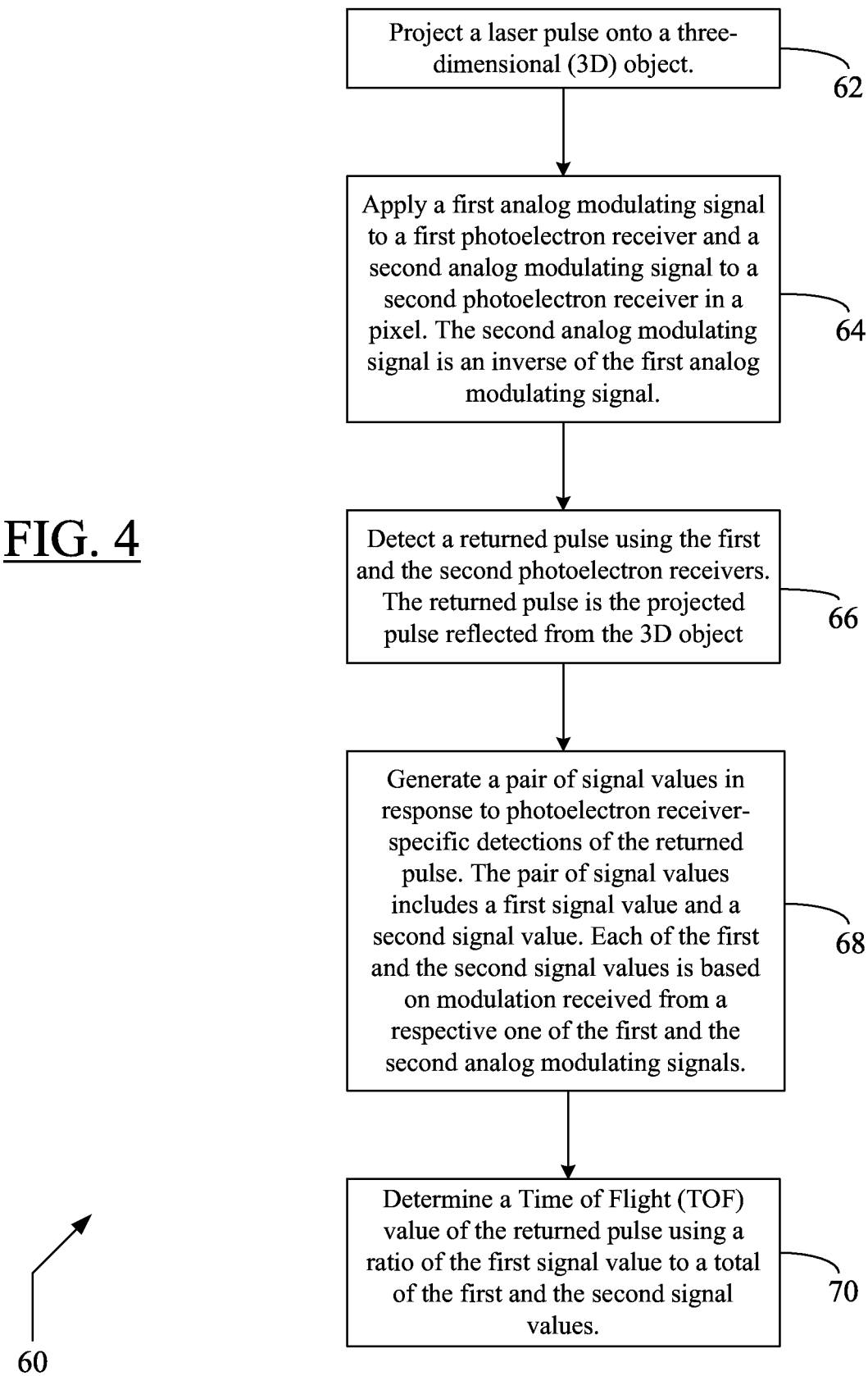
FIG. 4 depicts an exemplary flowchart showing how a TOF value may be determined in the system of FIGS. 1-2 according to one embodiment of the present disclosure.

FIG. 4 depicts an exemplary flowchart 60 showing how a TOF value may be determined in the system 15 of FIGS. 1-2 according to one embodiment of the present disclosure. Various steps illustrated in FIG. 4 may be performed by a single module or a combination of modules or system components in the system 15. In the discussion herein, by way of an example only, specific tasks are described as being performed by specific modules or system components. Other modules or system components may be suitably configured to perform such tasks as well. As noted at block 62, initially, the system 15 (more specifically, the projector module 22) may project a laser pulse, such as the pulse 28 in FIG. 2, onto a 3D object, like the object 26 in FIG. 2. At block 64, the processor 19 (or the pixel array control circuit 46 in certain embodiments) may apply a first analog modulating signal, such as the signal 54 in FIG. 3, to a first photoelectron receiver in a pixel and a second analog modulating signal, such as the signal 55 in FIG. 3, to a second photoelectron receiver in a pixel. Thus, as noted before, the modulating signals are applied to the pixel itself. The pixel may be any of the pixels 43 in the pixel array 42 in FIG. 2. In certain embodiments, the photoelectron receivers may include photogates—with or without additional circuits depending on the pixel architecture, as discussed later with reference to FIGS. 6 and 8. Furthermore, as noted at block 64, the second analog modulating signal 55 is an inverse of the first analog modulating signal 54. At block 66, the pixel array 42 in the image sensor unit 24 may detect a returned pulse, such as the pulse 37 in FIG. 2, using the first and the second photoelectron receivers. As mentioned earlier, the returned pulse 37 is the projected pulse 28 reflected from the 3D object 26.

At block 68, the pixel control and processing circuit 46 in the image sensor unit 24 may generate a pair of signal values in response to the photoelectron receiver-specific detections of the returned pulse. The pair of signal values at block 68 includes a first signal value and a second signal value, each of which is based on the modulation received from a respective one of the first and the second analog modulating signals applied at block 64. As discussed at length with reference to FIG. 3, the amplitude modulation provided by the analog modulating signals 54-55 may result in the generation of a pair of differential signal values—like the values P1 and P2 discussed before—that may be used to obtain the TOF information. Thus, as noted at block 70, either the pixel control unit 46 or the processor 19 in the system 15 may determine the TOF value of the returned pulse using a ratio of the first signal value to a total of the first and the second signal value. In other words, the TOF value may be determined from the ratio P1/(P1+P2), as outlined earlier.

FIG. 5 is an exemplary layout of a portion of an image sensor unit, such as the image sensor unit 24 in FIGS. 1-2, according to one embodiment of the present disclosure. The portion of the image sensor unit 24 shown in FIG. 5 may be relevant to provide the necessary signals for capturing the returned light and generating the P1 and P2 values for subsequent calculations of TOF values and, if desired, generation of a 3D image of the remote object 26. As in case of FIG. 2, the pixel array 42 in the image sensor unit 24 in FIG. 5 is shown as having nine pixels arranged as a 3×3 array for ease of illustration only; in practice, a pixel array may contain hundreds of thousands or millions of pixels in multiple rows and columns. In particular embodiments, each pixel in the pixel array 42 may have an identical configuration and, hence, each pixel is identified using the same reference numeral "43" as shown in FIG. 5. Two exemplary pixel configurations are shown in FIGS. 6 and 8, respectively, and discussed later. In the embodiment of FIG. 5, the 2D pixel array 42 may be a Complementary Metal Oxide Semiconductor (CMOS) array in which each pixel 43 may be either a two-tap pixel (like the pixel shown in the embodiment of FIG. 6) or a one-tap pixel (like the pixel shown in the embodiment of FIG. 8). In other embodiments, the pixels 43 may have configurations different from those shown in FIGS. 6 and 8.

Figure 7:
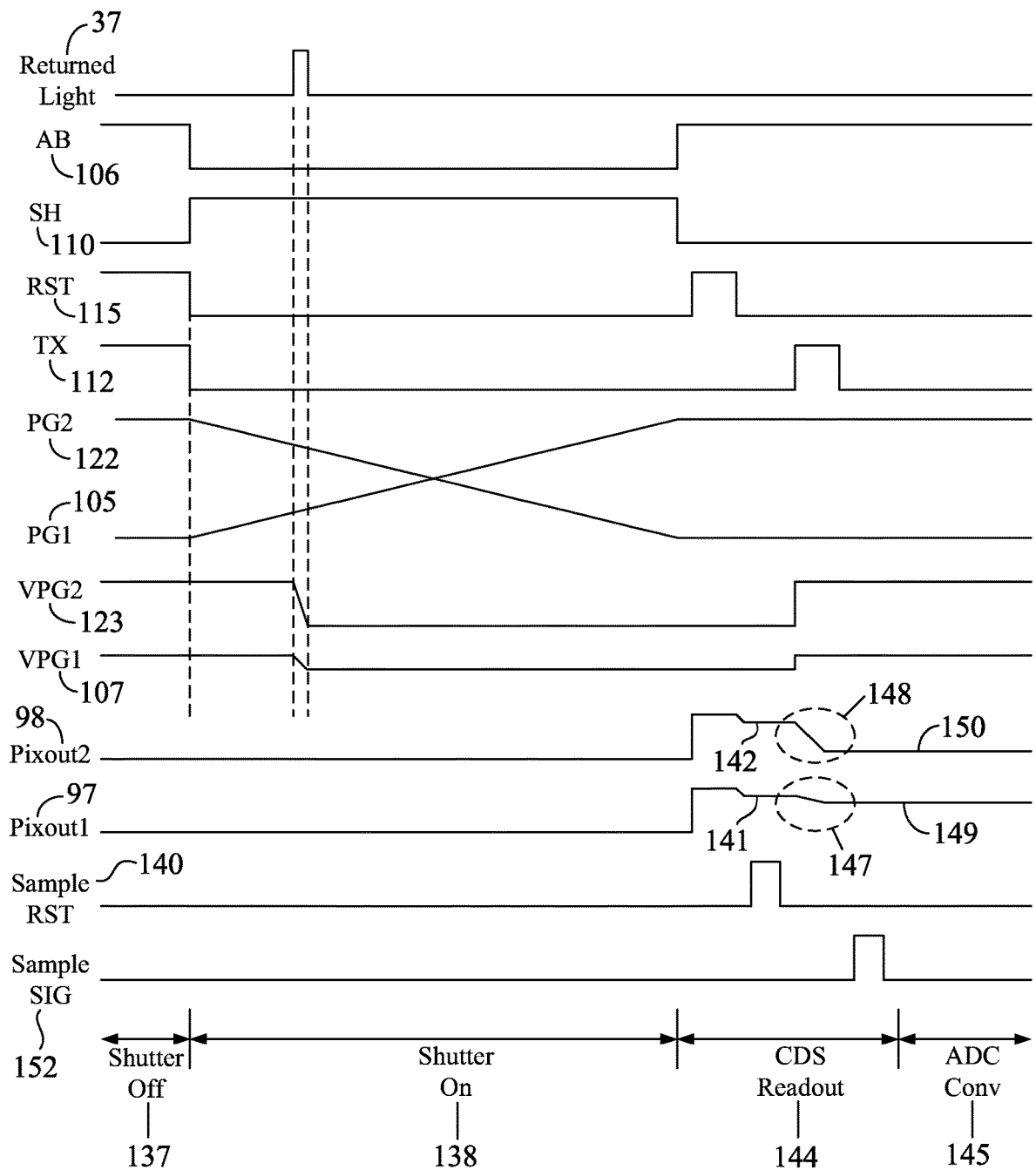
FIG. 7 is a timing diagram that shows exemplary timing of different signals in the system of FIGS. 1-2 when pixels in the embodiment of FIG. 6 are used in a pixel array for measuring TOF values according to certain embodiments of the present disclosure.

In addition to the pixel array 42, the image sensor unit 24 in the embodiment of FIG. 5 also may include a row decoder/driver 72, a column decoder 74, and a pixel column unit 76 that includes circuits for Correlated Double Sampling (CDS) as well as column-specific Analog-to-Digital Converters (ADCs) to be used during 2D and 3D imaging. In one embodiment, there may be one ADC per column of pixels. In particular embodiments, the processing units 72, 74, and 76 may be part of the pixel array control unit 46 shown in FIG. 2. In the embodiment of FIG. 5, the row decoder/driver 72 is shown to provide seven (7) different signals as inputs to each pixel 43 in a row of pixels to control the operation of the pixels in the pixel array 42 and to thereby enable generation of the column-specific pixout signals 78-80. Each of the arrows 82-84 in FIG. 5 illustrates the row-specific set of these signals to be applied as inputs to each pixel 43 in the corresponding row. These signals may include: a Reset (RST) signal, a Transfer (TX) signal, an electronic Shutter (SH) signal, an Anti-Bloom (AB) signal, a pair of Photogate (PG) modulating signals (PG1, PG2), and a row Select (SEL) signal. In case of the pixel configuration of FIG. 8, the TX signal may include a pair of transfer signals—TX1 and TX2—as discussed later. In the embodiments of FIGS. 7 and 9, the modulating signals PG1 and PG2 are similar to the inverse pair of analog modulation signals 54-55 shown in FIG. 3.

In one embodiment, the row Select (SEL) signal may be asserted to select an appropriate row of pixels. The row decoder/driver 72 may receive the address or control information for the row to be selected via the row address/control inputs 86, for example, from the processor 19. The row decoder/driver 72 may decode the received inputs 86 to enable it to select an appropriate row using the SEL signal and to also provide the corresponding RST, TX, and other signals to the selected/decoded row. A Reset (RST) signal may be applied to pixels in the selected row to reset those pixels to a pre-determined high voltage level. The electronic Shutter (SH) signal may facilitate application of the modulating signals PG1-PG2 to each pixel in the selected row and commencement of pixel-specific charge collection (associated with the received light) under the control of the modulating signals. An Anti-Bloom signal (AB) may prevent blooming of the pixel while shutter is off. A Transfer (TX) signal may be asserted to initiate transfer of the pixel-specific output voltage (PIXOUT or pixout) for subsequent processing. A more detailed discussion of these signals, when applied as pixel inputs, is provided later with reference to discussion of FIGS. 6-9. In certain embodiments, the row driver unit 72 may also receive control signals (not shown), for example, from the processor 19, to configure the row driver 72 to apply appropriate voltage levels for the SEL, RST, TX, SH, and various other signals mentioned at arrows 82-84.

The pixel column unit 76 may receive the PIXOUT signals 78-80—from the pixels in the selected row—and process them to generate pixel-specific signal values from which TOF measurements can be obtained. These signal values may be the earlier-mentioned P1 and P2 values, as illustrated by the arrow 88 in FIG. 5. Each column-specific ADC unit may process the received inputs (pixout signals) to generate the corresponding digital data outputs (P1/P2 values). More details of the CDS and ADC operations provided by the CDS and ADC circuits (not shown) in the pixel column unit 76 are provided later below with reference to FIGS. 7 and 9. In the embodiment of FIG. 5, the column decoder unit 74 is shown coupled to the pixel column unit 76. The column decoder 74 may receive a column address/control input 90, for example, from the processor 19, for the column to be selected in conjunction with a given row select (SEL) signal. The column selection may be sequential, thereby allowing sequential reception of the pixel output from each pixel in the row selected by the corresponding SEL signal. The processor 19 may provide appropriate row address inputs to select the row of pixels and may also provide appropriate column address inputs to the column decoder 74 to enable the pixel column unit 76 to receive outputs (pixouts) from the individual pixels in the selected row.

Figure 6:
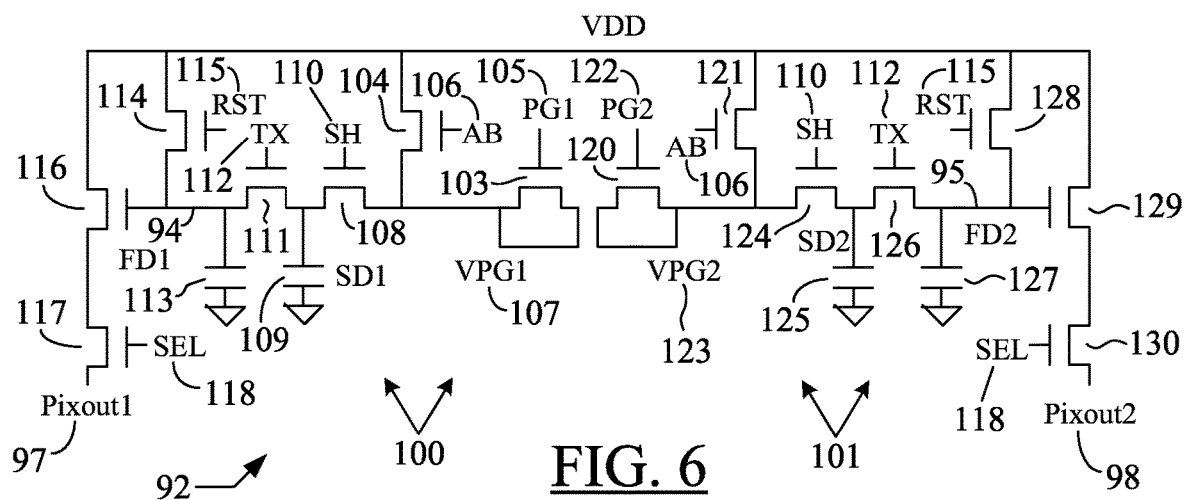
FIG. 6 shows exemplary circuit details of a two-tap pixel according to particular embodiments of the present disclosure.

FIG. 6 shows exemplary circuit details of a two-tap pixel 92 according to particular embodiments of the present disclosure. In particular embodiments, each of the pixels 43 in the pixel array 42 may have the configuration of the pixel 92 in FIG. 6. The two-tap pixel 92 may have two photoelectron collection "sites" 94-95, which may be referred to as Floating Diffusion (FD) junctions. Because of two separate photoelectron collection sites, the pixel 92 may be called a "two-tap" pixel, as opposed to the one-tap pixel discussed later with reference to FIG. 8. The two separate charge collection sites may provide corresponding separate pixel outputs 97-98, which may be sent to a column ADC unit (not shown) for generation of the respective P1 and P2 values, as discussed later with reference to FIG. 7. Generally, the two-tap pixel 92 in FIG. 6 may have a symmetrical configuration with two substantially identical circuit portions 100-101. For ease of discussion, each circuit portion 100-101 may be divided into three operational units: a charge generation portion, a signal collection portion, and a signal transfer portion. The label "VDD" in FIGS. 6 and 8 refers to the supply voltage, which, in some embodiments, may be in the range of 2.5V (volts) to 2.8V.

The charge generation portion of the circuit portion 100 may include an N-channel Metal Oxide Semiconductor Field Effect Transistor (NMOS) transistor 103 as a photogate (PG) and an NMOS Anti-Bloom (AB) transistor 104 connected as shown. The photogate 103 may receive an analog modulating signal (PG1) 105 at the gate terminal thereof and the transistor 104 may receive an AB signal 106 at the gate terminal thereof, as shown. The AB signal 106 and the analog modulating signal 105 (PG1) may be received from the row decoder/driver 72 (FIG. 5). The PG1 signal 105 may be analogized with the analog modulating signal 54 in FIG. 3. The photogate 103 may convert the incident photons—such as, for example, in the returned light pulse 37—into electrons (also referred to as "photoelectrons") under operative control of the analog modulating signal PG1. Thus, the photogate 103 may convert the optical input signal into an electrical signal in the charge domain. The electrical charge or photoelectrons may appear as a photogate output signal VPG1, which is identified using the reference numeral "107." In certain embodiments, a pinned photodiode, an avalanche photodiode, or other optical transducer may be used instead of a photogate, with suitable circuit modifications as needed.

The signal collection portion of the circuit portion 100 may include an NMOS transistor 108 for electronic Shutter (SH) functionality and a capacitor 109 (referred to as "SD1" in FIG. 6) associated with the Storage Diffusion (SD) node at the source terminal of the transistor 108. For ease of illustration, the SD node is not individually identified with a reference numeral, and the term "SD1" may be used herein to interchangeably refer to the SD node or the capacitor 109. The transistor 108 may receive an SH signal 110 as an input applied to its gate terminal, as shown. These components may be connected as illustrated in FIG. 6. The SH signal 110 may be received from the row decoder/driver 72 (FIG. 5). Thus, the signal collection portion is connected to the charge generation portion to receive—under the control of the electronic shutter input—the electrical signals (VPG1) generated by the charge generation portion. More specifically, the AB signal 106 may be asserted while the SH signal 110 is "off" to substantially reduce or prevent the "blooming" or over-saturation of the pixel 92. The AB signal 106 is turned "off" once the SH signal 110 is turned "on." While the electronic shutter is "open" (with the SH signal being active), the photogate 103 may sense the received light and the captured charge—as given by the VPG1 output 107—may be stored in the SD1 capacitor 109. It is noted here that the VPG1 signal 107 and, hence, the Pixout1 signal 97, is dependent on the ratio of the modulating signals PG1 and PG2, as discussed in more detail with reference to FIG. 7.

The signal transfer portion of the circuit portion 100 may include a Transfer (TX) gate NMOS transistor 111 that receives a TX signal 112 at its gate terminal, a capacitor 113 associated with the floating diffusion node 94 (referred to as the "FD1" node in FIG. 6), an NMOS Reset (RST) transistor 114 that receives an RST signal 115 at its gate terminal, an NMOS source follower 116 as a buffer amplifier, and an NMOS Select (SEL) transistor 117 in cascode with the source follower 116 and receiving an SEL signal 118 at its gate terminal. The TX signal 112, the RST signal 115, and the SEL signal 118 may be received from the row decoder/driver 72 (FIG. 5). Various components forming the signal transfer portion may be connected as shown in FIG. 6.

Briefly, the signal transfer portion receives a plurality of external inputs—the RST, TX, and SEL signals—and is operable to transfer the electrical signals received by the signal collection portion as the pixel output (Pixout1) 97 in response to those external inputs. More specifically, once the pixel is selected by the SEL input 117 and reset by the RST input 115, the transfer gate 111 may be "closed" to transfer the photon-generated electrons (or photoelectrons) collected at the SD1 capacitor 109 to the floating diffusion 94 using the capacitor 113. In the discussion herein, the capacitor 113 may be occasionally referred to as the "FD1 capacitor". The voltage at the floating diffusion 94 may be later transferred as the Pixout1 signal 97 to an ADC unit (not shown) using the transistor 117 and converted into an appropriate digital signal—here, the "P1" value in equations (7) and (8)—for subsequent processing. More details of the timing and operation of various signals in FIG. 6 are provided below with reference to discussion of FIG. 7.

In FIG. 6, except for the PG2 signal, all other signals—like the SEL signal, the SH signal, the TX signal, and so on—received by the circuit portion 101 are the same as those identified in the circuit portion 100. Thus, identical reference numerals are used to refer to the signals that are common between the circuit portions 100 and 101. Furthermore, the components forming the circuit portion 101 are substantially identical to their counterparts in the circuit portion 100. In view of the extensive discussion of entities associated with the reference numerals "103" through "118" in the circuit portion 100 above, no additional discussion of the functionality of similar components and signals associated with reference numerals "120" through "130" in the circuit portion 101 is provided for the sake of brevity. The earlier discussion of the construction and operation of the circuit portion 100 remains applicable to the similarly-constructed circuit portion 101. Briefly, in the circuit portion 101, the charge generation portion includes the entities associated with the reference numerals 106 and 120-123, the signal collection portion includes the entities associated with the reference numerals 110 and 124-125, and the signal transfer portion includes the entities associated with the reference numerals 112, 115, 118, and 126-130. In the circuit portion 101, the VPG2 signal 123, and, hence, the Pixout2 signal 98 is dependent on the ratio of the modulating signals PG1 and PG2. The Pixout2 signal 98 may be transferred to an ADC unit (not shown) using the transistor 134 and converted into an appropriate digital signal—here, the "P2" value in equations (7) and (8)—for subsequent processing.

It is noted here that, in some embodiments, the pixel 92 in FIG. 6 and the pixel 155 in FIG. 8 (discussed later) may be formed of P-channel Metal Oxide Semiconductor Field Effect Transistors (PMOS) or other different types of charge transfer devices.

In the embodiment of FIG. 6, the pixel 92 may be considered as having two photoelectron receiver circuits (or, simply, "photoelectron receivers"), each of which receives the corresponding modulating signal PG1 or PG2. These photoelectron receivers can split the generated photoelectrons into two parts based on the signal levels of the two modulating signals PG1 and PG2. The first "photoelectron receiver" in FIG. 6 may include the photogate 103, the transistors 104 and 108, and the capacitor 109. Similarly, the second "photoelectron receiver" in FIG. 6 may include the photogate 120, the transistors 121 and 124, and the capacitor 125. As discussed later, the pixel 155 in FIG. 8 may be considered to be composed of similar photoelectron receivers as well. More generally, the teachings of the present disclosure apply to any pixel design that includes two circuits—whether photogate-based, photodiode-based, or any other photo-sensor based—that can split the generated photoelectrons into two separate parts based on the levels of two separate analog modulation signals. Furthermore, in some embodiments, such a pixel design may include only one photo-sensor, like an avalanche photodiode, as opposed to the two photo-sensor based configurations in the embodiments of FIGS. 6 and 8. In the single photo-sensor based configuration, the generated charge may be divided into two parts by appropriate circuits using two analog modulating signals, like the signals 54-55 in FIG. 3.

FIG. 7 is a timing diagram 135 that shows exemplary timing of different signals in the system 15 of FIGS. 1-2 when pixels 92 in the embodiment of FIG. 6 are used in a pixel array, such as the pixel array 42 in FIGS. 2 and 5, for measuring TOF values according to certain embodiments of the present disclosure. Various input and output signals—such as the AB signal 106, the SH signal 110, the Pixout1 signal 97, and the like—shown in the embodiment of FIG. 6 are identified in FIG. 7 using the same reference numerals for the sake of consistency and ease of discussion. To generate the pair of pixel-specific differential outputs Pixout1 and Pixout2, the pixel 92—more specifically, at least a row of pixels—may have to be initially selected using the SEL signal 118. In the context of FIG. 7, it is assumed that the row decoder/driver 72 (FIG. 5) has already asserted an appropriate SEL signal 118 (not shown in FIG. 7) to select a row of pixels. Initially, all of the pixels in the selected row may be reset to a high voltage using the RST line 115. The "reset" level of the pixel 92 may represent an absence of pixel-specific detection of the returned light pulse 37. The RST signal 115 may be released from its high level for a pre-determined time to facilitate integration of photoelectrons received by the pixel 92. It is noted here that, in one embodiment, the RST lines may remain high or "on" for unselected rows of pixels to prevent blooming. Furthermore, at the beginning of the operation of light sensing/detection, the anti-blooming (AB) input 106 of the pixel 92 may be fully "on" (or high) as well and the shutter (SH) input 110 may be fully "off" (or low) to turn off the electronic shutter. The shutter "off" event is indicated by arrow 137 in FIG. 7. It is noted here that the "high" or "low" signal levels relate to the design of the pixel 92. The signal polarities or bias levels may be different in other types of pixel designs based on, for example, the types of transistors or other circuit components used.

After the light pulse 28 (FIG. 2) is projected and after some additional delay, the shutter may be turned "on" by lowering the AB signal 106 and the RST signal 115, and by raising the SH signal 110. The shutter "on" or "active" period is indicated by arrow 138 in FIG. 7. During the shutter "on" period, the two PG gate voltages—PG1 and PG2—may be ramped up linearly in opposite directions, as shown by the waveforms 105 and 122 in FIG. 7. In the exemplary illustration of FIG. 7, the PG1 signal 105 is shown ramping up whereas the PG2 signal 122 is shown ramping down. The PG1 signal 105 may be considered as the function "m(t)" in equation (4) above and the PG2 signal 122 may be represented by the term "1−m(t)" in equation (5) above.

A pixel's detection of incident light may be called an "ON event," whereas a decrease in the intensity of incident light may produce an "OFF event." The photocurrent generated in response to an ON event may decrease the pixel output voltage (PIXOUT) from its initial reset level. A pixel thus functions as a transducer to convert received luminance/light signal into a corresponding electrical (analog) voltage, which is generally designated as a PIXOUT signal in FIGS. 5-9. Each pixel in a row of pixels may be read individually. The analog pixout signal may be converted to a digital value by the corresponding column ADC.

Referring again to FIG. 7, when the photogates 103, 120 sense the received luminance and capture the returned light pulse 37 during the shutter "on" period, the converted photoelectrons are split between the two photogates 103, 120 based on the ratio of the modulating voltages PG1 and PG2. The corresponding photogate outputs VPG1 and VPG2—as modulated by the analog modulating signals PG1 and PG2—are shown in FIG. 7. As noted before, the divided charge may be stored on the respective SD nodes (SD1, SD2) through the capacitors 109, 125. It is observed that if the TOF of the received pulse 37 is smaller than half of the shutter-on period, the voltage change on the SD1 capacitor 109 (FIG. 6) may be smaller than that on the SD2 capacitor 125. On the other hand, if the TOF is larger than half of the shutter-on period, the voltage change on the SD2 capacitor 125 may be larger than that on the SD1 capacitor 109. After the shutter is turned off, the floating diffusion nodes 94-95 may be reset first, as indicated by the brief assertion of the RST signal 115. Thereafter, a "Sample RST" signal 140 may be internally asserted by the appropriate column-specific readout circuits (not shown) in the pixel column unit 76 to sample the respective reset levels 141-142 of the pixout signals 97-98 from both the taps 94-95. Such a sampling may be part of a Correlated Double Sampling (CDS) readout period indicated by arrow 144 in FIG. 7. The CDS operation is briefly described below. In certain embodiments, the Sample RST signal 140 also may be used to reset the corresponding column-specific ADC unit (not shown) so that the ADC unit is "ready" to sample the correct signal value of the pixel outputs later during the ADC conversion period, which is indicated by the arrow 145 in FIG. 7. In other embodiments, a separate "ADC Reset" signal may be internally used to reset an ADC unit. In some embodiments, all column-specific ADC units may be reset together using a common ADC reset signal instead of individual ADC-specific reset signals. In one embodiment, the ADCs may be reset to a pre-determined binary value, such as a binary "0" or other known number.

It is understood that the CDS is a noise reduction technique for measuring an electrical value, such as a pixel/sensor output voltage (pixout), in a manner that allows removal of an undesired offset. In particular embodiments, a column-specific CDS unit (not shown) may be employed in the pixel column unit 76 (FIG. 5) to perform correlated double sampling. In CDS, the output(s) of a pixel, such as the pixel 92 in FIG. 6, may be measured twice—once in a known condition, and once in an unknown condition. The value measured from the known condition may be then subtracted from the value measured from the unknown condition to generate a value with a known relation to the physical quantity being measured—here, the photoelectron charge representing the pixel-specific portion of the received light. Using CDS, noise may be reduced by removing the reference voltage of the pixel (such as, for example, the pixel's voltage after it is reset) from the signal voltage of the pixel at the end of each integration period. Thus, in CDS, before the charge of a pixel is transferred as an output, the reset value is sampled—as shown by the assertion of the sample RST signal 140 discussed before. The reference value is "deducted" from the value after the charge of the pixel is transferred. Thus, the CDS output is the difference between the pixel's reset level and the received signal level.

In the embodiment of FIG. 7, the collection (or sampling) of the respective signal levels of the differential pixel outputs 97-98 may be initiated by turning on the TX gates 111, 126 to transfer the collected photoelectrons from the SD capacitors 109, 125 to the FD capacitors 113, 127 and, hence, to the FD nodes 94-95. In FIG. 7, the dotted ovals 147-148 show the transition of the respective pixel outputs 97-98 to the signal voltages 149-150 at the end of the integration period, which, in particular embodiments, may correspond to the period during which an electronic shutter is active, such as the shutter-on period 138 in FIG. 7. Such transition and the resulting signal levels 149-150 reflect the amplitude-modulated outputs VPG1 and VPG2, respectively, generated under the control of the corresponding analog modulating signals PG1 and PG2. During the CDS readout period 144, these light signal levels 149-150 may be sampled again. Such a sampling operation may be triggered by the assertion of a "Sample Signal (SIG)" pulse 152. Like the Sample RST pulse 140, the Sample SIG pulse 152 also may be internally asserted by the appropriate column-specific readout circuits (not shown) in the pixel column unit 76 (FIG. 5) to enable the corresponding column-specific CDS unit to obtain the values of the received signal levels 149-150 and, hence, to generate a corresponding pair of pixel-specific CDS outputs for the pixel 92.

It is noted here that, during the CDS readout period 144, two reset levels 141-142 may be sampled in parallel, for example, using an identical pair of CDS circuits as part of the column-specific CDS unit. Similarly, the two signal levels 149-150 also may be sampled in parallel to generate a pair of pixel-specific CDS outputs. Thus, although one Sample RST signal 140 and one Sample SIG signal 152 are shown in FIG. 7, these signals may be applied substantially simultaneously to each CDS circuit in the pair. Alternatively, in some embodiments, each CDS circuit may have its own Sample RST and Sample SIG signal, in which case there may be two Sample RST signals—each similar to the signal 140, and two Sample SIG signals—each similar to the signal 152. Subsequently, the pixel-specific CDS outputs may be converted to digital values—here, the P1 and P2 values indicated by arrow 88 in FIG. 5—by the respective column-specific ADC unit (not shown) in the pixel column unit 76. In one embodiment, the P1 and P2 values may be generated in parallel using, for example, an identical pair of ADC circuits as part of the column-specific ADC unit. Thus, the differences between the reset levels and corresponding light levels of pixout signals 97-98 are converted to digital numbers by a column parallel ADC and output as the pixel-specific signal values—P1 and P2—to enable the computation of the pixel-specific TOF value of the returned pulse 37 for the pixel 92 based on the equation (8) given before. As noted earlier, such computation may be performed by the pixel array processing unit 46 itself or by the processor 19 in the system 15. Consequently, a pixel-specific distance to the 3D object 26 (FIG. 2) also may be determined using, for example, equation (2) or equation (3). The pixel-by-pixel charge collection operation may repeat for all the rows of pixels in the pixel array 42. Based on all the pixel-specific distance or range values for the pixels 43 in the pixel array 42, a 3D image of the object 26 may be generated, for example, by the processor 19, and displayed on an appropriate display or user interface associated with the system 15. Furthermore, a 2D image of the 3D object 26 may be generated—for example, when no range values are calculated or when a 2D image is desired despite the availability of range values—by simply adding the P1 and P2 values. In particular embodiments, such a 2D image simply may be a grayscale image, for example, when an IR laser is used.

Figure 8:
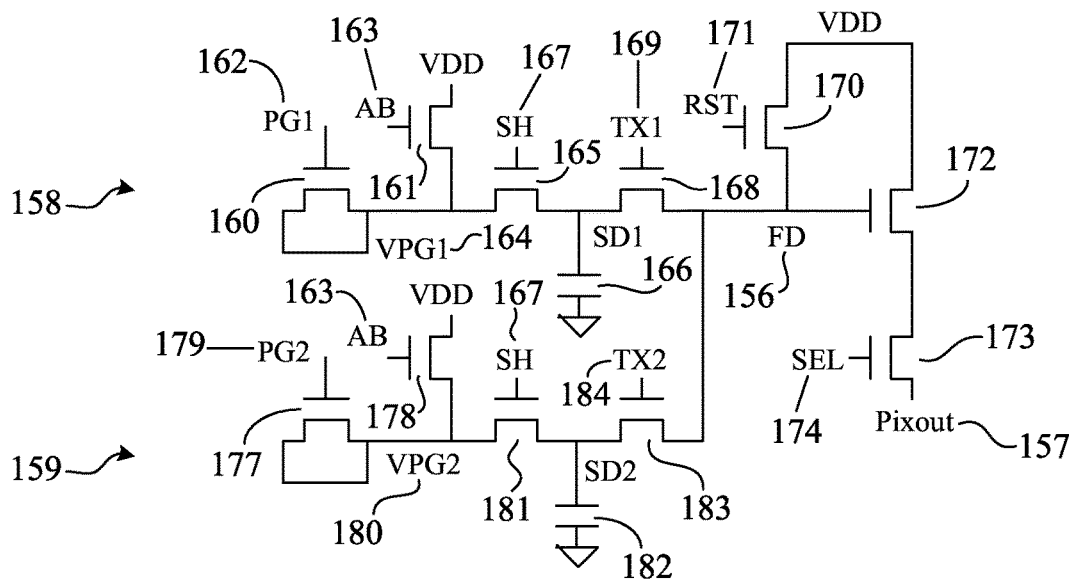
FIG. 8 shows exemplary circuit details of a one-tap pixel according to particular embodiments of the present disclosure.
Figure 9:
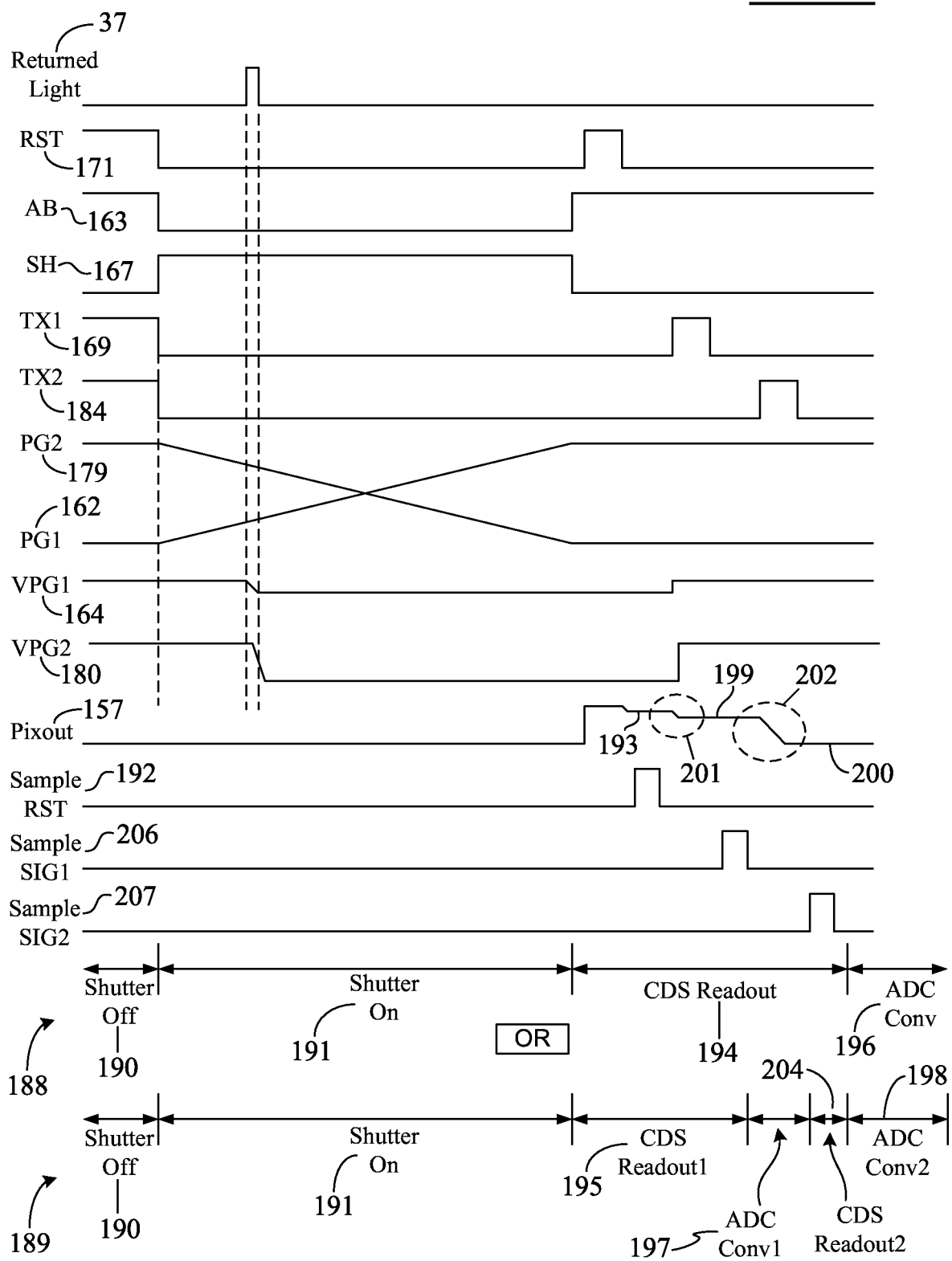
FIG. 9 is a timing diagram that shows exemplary timing of different signals in the system of FIGS. 1-2 when pixels in the embodiment of FIG. 8 are used in a pixel array for measuring TOF values according to particular embodiments of the present disclosure.

FIG. 8 shows exemplary circuit details of a one-tap pixel 155 according to particular embodiments of the present disclosure. Except for being a one-tap pixel, the pixel 155 in FIG. 8 is substantially similar in design to the two-tap pixel 92 of FIG. 6. Hence, only a brief description of the circuit configuration in FIG. 8 is provided here for the sake of brevity. Similarly, only the salient aspects of the operation of the one-tap pixel 155 are discussed later with reference to FIG. 9. It is observed that, in particular embodiments, each of the pixels 43 in the pixel array 42 may have the configuration of the pixel 155 in FIG. 8. The pixel 155 has one photoelectron collection "site" or FD junction 156 and, hence, the pixel 155 may be called a "one-tap" pixel, as opposed to the two-tap pixel 92 discussed earlier with reference to FIG. 6. The single charge collection site 156 may provide a single pixel output 157, which may be sent to a column ADC unit (not shown) for generation of the respective P1 and P2 values, as discussed later with reference to FIG. 9. As shown, the one-tap pixel 155 in FIG. 8 may have a symmetrical configuration with two substantially identical circuit portions 158-159 sharing a common FD junction 156 and connected output circuit. As in case of the two-tap pixel 92 in FIG. 6, each circuit portion 158-159 of the one-tap pixel 155 in FIG. 8 also may be divided into three operational units: a charge generation portion, a signal collection portion, and a signal transfer portion.

The charge generation portion of the circuit portion 158 may include an NMOS transistor 160 as a photogate (PG) and an NMOS Anti-Bloom (AB) transistor 161 connected as shown. The photogate 160 may receive an analog modulating signal (PG1) 162 at the gate terminal thereof and the transistor 161 may receive an AB signal 163 at the gate terminal thereof, as shown. The AB signal 163 and the analog modulating signal 162 (PG1) may be received from the row decoder/driver 72 (FIG. 5). The PG1 signal 162 may be analogized with the analog modulating signal 54 in FIG. 3. The electrical charge or photoelectrons generated by the photogate 160 may appear as a photogate output signal VPG1, which is identified using the reference numeral "164." In certain embodiments, a pinned photodiode or other optical transducer may be used instead of a photogate, with suitable circuit modifications as needed.

The signal collection portion of the circuit portion 158 may include an NMOS transistor 165 for electronic Shutter (SH) functionality and a capacitor 166 (referred to as "SD1" in FIG. 8) associated with the storage diffusion node at the source terminal of the transistor 165. For ease of illustration, the SD node is not individually identified with a reference numeral, and the term "SD1" may be used herein to interchangeably refer to the SD node or the capacitor 166. In certain embodiments, the SD capacitors—like the capacitors 109 (FIG. 6), 166 (FIG. 8), and the like—may not be extra capacitors, but may be merely the junction capacitors of the respective SD nodes. The transistor 165 may receive an SH signal 167 as an input applied to its gate terminal, as shown. These components may be connected as illustrated in FIG. 8. The SH signal 167 may be received from the row decoder/driver 72 (FIG. 5). Thus, the signal collection portion is connected to the charge generation portion to receive—under the control of the electronic shutter input—the electrical signals (VPG1) generated by the charge generation portion. It is noted here that the VPG1 signal 164 and, hence, the Pixout signal 157, is dependent on the ratio of the modulating signals PG1 and PG2, as discussed in more detail with reference to FIG. 9.

The signal transfer portion of the circuit portion 158 may include a transfer gate NMOS transistor 168 that receives a TX1 signal 169 at its gate terminal, an NMOS Reset transistor 170 that receives an RST signal 171 at its gate terminal, an NMOS source follower 172 as a buffer amplifier, and an NMOS Select transistor 173 in cascode with the source follower 172 and receiving an SEL signal 174 at its gate terminal. It is noted here that the circuit including the Reset transistor 170, the source follower 172, and the Select transistor 173 may be shared with the pixel portion 159 as part of its signal transfer portion. The TX1 signal 169, the RST signal 171, and the SEL signal 174 may be received from the row decoder/driver 72 (FIG. 5). Various components forming the signal transfer portion may be connected as shown in FIG. 6. Because of a single pixout line 157 in the one-tap pixel 155, two separate transfer (TX) signals—TX1 and TX2—may be provided to sequentially transfer each circuit portion-specific charge from the FD node 156 to an ADC unit (not shown) via the common pixout line 157. More details of the timing and operation of various signals in FIG. 8 are provided below with reference to discussion of FIG. 9.

In FIG. 8, except for the PG2 and TX2 signals, all other signals—like the SEL signal, the SH signal, the AB signal, and so on—received by the circuit portion 159 are the same as those identified in the circuit portion 158. Thus, identical reference numerals are used to refer to the signals that are common between the circuit portions 158 and 159. Furthermore, the components forming the circuit portion 159 are substantially identical to their counterparts in the circuit portion 158. In view of the earlier discussion of entities associated with the reference numerals "160" through "174" in the circuit portion 158 above, no additional discussion of the functionality of similar components and signals associated with reference numerals "177" through "184" in the circuit portion 159 is provided for the sake of brevity. The earlier discussion of the construction and operation of the circuit portion 158 remains applicable to the similarly-constructed circuit portion 159. Briefly, in the circuit portion 159, the charge generation portion includes the entities associated with the reference numerals 163 and 177-180, the signal collection portion includes the entities associated with the reference numerals 167 and 181-182, and the signal transfer portion includes the entities associated with the reference numerals 170-174 and 183-184.

Like the pixel 92 in FIG. 6, the pixel 155 in the embodiment of FIG. 8 also may be considered as having two photoelectron receiver circuits (or, simply, "photoelectron receivers"), each of which receives the corresponding modulating signal PG1 or PG2. These photoelectron receivers may split the generated photoelectrons into two parts based on the signal levels of the two modulating signals PG1 and PG2. The first "photoelectron receiver" in FIG. 8 may include the photogate 160, the transistors 161 and 165, and the capacitor 166. Similarly, the second "photoelectron receiver" in FIG. 8 may include the photogate 177, the transistors 178 and 181, and the capacitor 182.

FIG. 9 is a timing diagram 187 that shows exemplary timing of different signals in the system 15 of FIGS. 1-2 when pixels 155 in the embodiment of FIG. 8 are used in a pixel array, such as the pixel array 42 in FIGS. 2 and 5, for measuring TOF values according to particular embodiments of the present disclosure. Various input and output signals—such as the AB signal 163, the SH signal 167, the Pixout signal 157, and the like—shown in the embodiment of FIG.

8 are identified in FIG. 9 using the same reference numerals for the sake of consistency and ease of discussion. Except for the assertion of two transfer siganls—TX1 and TX2—and associated CDS readout operations, the timing diagram 187 in FIG. 9 is substantially similar to the timing diagram 135 in FIG. 7, which has been discussed at length before. Therefore, only a brief description of the charge transfer and ADC conversion operations in the embodiment of FIG. 9 is provided below.

In the embodiment of FIG. 9, there may be two different ways 188-189 to generate the P1 and P2 values through ADC conversion. Either of these approaches may be used to perform the ADC conversion. The shutter "off" period 190 and the shutter "on" period 191 may be the same for both of these approaches, as shown in FIG. 9. In particular embodiments, the shutter "on" or "active" period 191 may represent the charge integration duration, as noted before. In both of the options 188-189, after the shutter "active" period 191 is over, the floating diffusion node 156 may be reset first, as indicated by the brief assertion of the RST signal 171. Thereafter, a "Sample RST" signal 192 may be internally asserted by the appropriate column-specific readout circuits (not shown) in the pixel column unit 76 to sample the reset level 193 of the pixout signal 157. Such a sampling may be part of both of the CDS readout periods 194 or 195, regardless of which of the two options 188-189 is implemented. As noted before, in certain embodiments, the Sample RST signal 192 also may be used to reset the corresponding column-specific ADC unit (not shown) so that the ADC unit is "ready" to sample the correct signal value of the respective pixel output during the ADC conversion period. In case of the first approach 188, there may be a single ADC conversion period 196, whereas there may be two ADC conversion periods 197-198 in the second approach 189 as discussed in more detail below. As also mentioned before, in some embodiments, a separate "ADC Reset" signal may be internally used to reset an ADC unit. In other embodiments, all column-specific ADC units may be reset together using a common ADC reset signal instead of individual ADC-specific reset signals. In one embodiment, the ADCs may be reset to a pre-determined binary value, such as a binary "0" or other known number.

In the embodiment of FIG. 9, the collection (or sampling) of the signal levels 199-200 of the pixel output 157 may be initiated by sequentially turning on the TX gates 168, 183 to transfer the collected photoelectrons from the SD capacitors 166, 182 to the FD node 156. In FIG. 9, the dotted ovals 201-202 show the transition of the pixel output 157 to the signal voltages 199-200 at the end of the integration period, which, in particular embodiments, may correspond to the period during which an electronic shutter is active, such as the shutter-on period 191 in FIG. 9. Such transition and the resulting signal levels 199-200 reflect the amplitude-modulated outputs VPG1 and VPG2, respectively, generated under the control of the corresponding analog modulating signals PG1 and PG2. It is observed here that the signal level 199 may represent the "P1" value—that is, the charge collected at the SD1 capacitor 166. However, the signal level 200 may represent the "P1+P2" values—that is, the total charge collected by the SD1 and SD2 capacitors because the signal level 200 "builds" on the earlier pixout voltage level 199 in view of a single pixel output line 157 available to output the collected charge. This is not the case in the embodiment of FIG. 7 because of two separate pixout lines 97-98. As a result, two different options 188-189 may be used to "read" the collected charge given by the pixout signal 157. In the first approach 188, a single CDS readout period 194 may be used to sample both of the signal levels 199-200. On the other hand, in the second approach 189, two separate CDS readout periods 195, 204 may be used to sample individual signal levels 199-200 as discussed below.

During the CDS readout period 194 in the first option 188, the light signal levels 199-200 may be sequentially sampled. Such a sampling operation may be triggered by the assertion of a first "Sample SIG1" pulse 206 followed by a second "Sample SIG2" pulse 207, as shown. Like the Sample RST pulse 192, these Sample SIG pulses 206-207 also may be internally asserted by the appropriate column-specific readout circuits (not shown) in the pixel column unit 76 (FIG. 5) to enable the corresponding column-specific CDS unit to obtain the values of the received signal levels 199-200 and, hence, to generate a corresponding pair of pixel-specific CDS outputs for the pixel 155. It is noted here that a single CDS circuit may suffice in the embodiment of FIG. 9 because of the sequential nature of the sampling operation. Initially, the first signal level 199 may be sampled during the CDS readout period 194—as triggered by the Sample SIG1 pulse 206—and the pixel reset level 193 may be subtracted from the sampled level 199 to generate a first CDS output (not shown) representing the "P1" value. The first CDS output value may be stored internally in the CDS unit itself or in a storage portion (not shown) within the pixel array control unit 46. Thereafter, the second signal level 200 may be sampled using the Sample SIG2 pulse 207. As mentioned before, the signal level 200 may represent the "P1+P2" value or the total of the P1 and P2 values. In this case, the earlier-sampled signal value 199—stored as the first CDS output—may be used as a new "reset" level and subtracted from the sampled value 200 to generate a second CDS output (not shown) representing the "P2" value. Subsequently, these first and second CDS outputs may be sent to the respective column-specific ADC unit to be converted into corresponding digital values—here, the "P1" and "P2" values indicated by arrow 88 in FIG. 5. In one embodiment, if there is only one set of sampling capacitor and ADC unit per column, the ADC unit may sequentially generate the P1 and P2 values in response to receipt of each CDS output. In another embodiment, upon receiving both the first and the second CDS outputs, the ADC unit may substantially simultaneously generate the P1 and P2 values by having two sets of sampling capacitors and ADCs per column-specific ADC unit so as to digitize P1 and P2 values in parallel.

In contrast, the CDS readout and ADC conversion operations in the second approach 189 are slightly different. During the first CDS readout period (the "CDS Readout1" period in FIG. 9) 195, the first signal level 199 may be sampled—using the Sample SIG1 pulse 206—and the pixel reset level 193 may be subtracted therefrom to generate a first CDS output (not shown), which may be sent to the respective ADC unit to generate the pixel-specific signal value "P1" during the first ADC conversion period (referred to as the "ADC Conv1" period in FIG. 9) 197. Thereafter, during the second CDS readout period (the "CDS Readout2" period in FIG. 9) 204, the CDS the second signal level 200 may be sampled—using the Sample SIG2 pulse 207—and the pixel reset level 193 may be subtracted therefrom to generate a second CDS output (not shown) representing the "P1+P2" value or the total collected charge with reference to the original pixel reset level 193. This second CDS output may be digitized and converted as a "P1+P2" value by the respective ADC unit during the second ADC conversion period (referred to as the "ADC Conv2" period in FIG. 9) 198. Thus, in the second approach 189, the output of an ADC unit in the pixel column unit 76 (FIG. 5) may represent "P1"

and "P1+P2" values, as opposed to the "P1" and "P2" values in case of the first approach 188 discussed above. In the second approach 189, only one set of sampling capacitor and ADC unit per column may be needed to first digitize "P1", and then to digitize "P1+P2".

Thus, using either of the two approaches 188-189, the pixel-specific TOF value of the returned pulse 37 may be computed for the pixel 155 based on the equation (8) given before. As noted earlier, such computation may be performed by the pixel array processing unit 46 itself or by the processor 19 in the system 15. Consequently, a pixel-specific distance to the 3D object 26 (FIG. 2) also may be determined using, for example, equation (2) or equation (3). The pixel-by-pixel charge collection operation may repeat for all the rows of pixels in the pixel array 42. Based on all the pixel-specific distance or range values for the pixels 43 in the pixel array 42, a 3D image of the object 26 may be generated, for example, by the processor 19, and displayed on an appropriate display or user interface associated with the system 15. Furthermore, the pixel-specific P1 and P2 values obtained in either of the two approaches 188-189 may be added to generate a 2D image of the 3D object 26, for example, when no range values are calculated or when a 2D image is desired despite the availability of range values. In particular embodiments, such a 2D image simply may be a grayscale image, for example, when an IR laser is used.

In summary, each of the pixel designs 92 (FIG. 6) and 155 (FIG. 8) includes two photoelectron receiver circuits, and the distribution of the received charge between these two circuits is controlled by the difference (or ratio) of the two analog modulating voltages—PG1 and PG2. Thus, TOF technique is combined with analog amplitude modulation on a single pixel to create differential signals—VPG1 and VPG2 (or corresponding Pixout signals)—that are modulated in time-domain for TOF measurement. The TOF-based measurement of range and its resolution are controllable by changing the duration of modulation imparted through the modulating signals PG1 and PG2. As a result, an autonomous navigation system that uses an AM-based TOF image sensor as per teachings of the present disclosure may provide improved vision for drivers under difficult driving conditions such as, for example, low light, fog, bad weather, strong ambient light, and so on.

Figure 10:
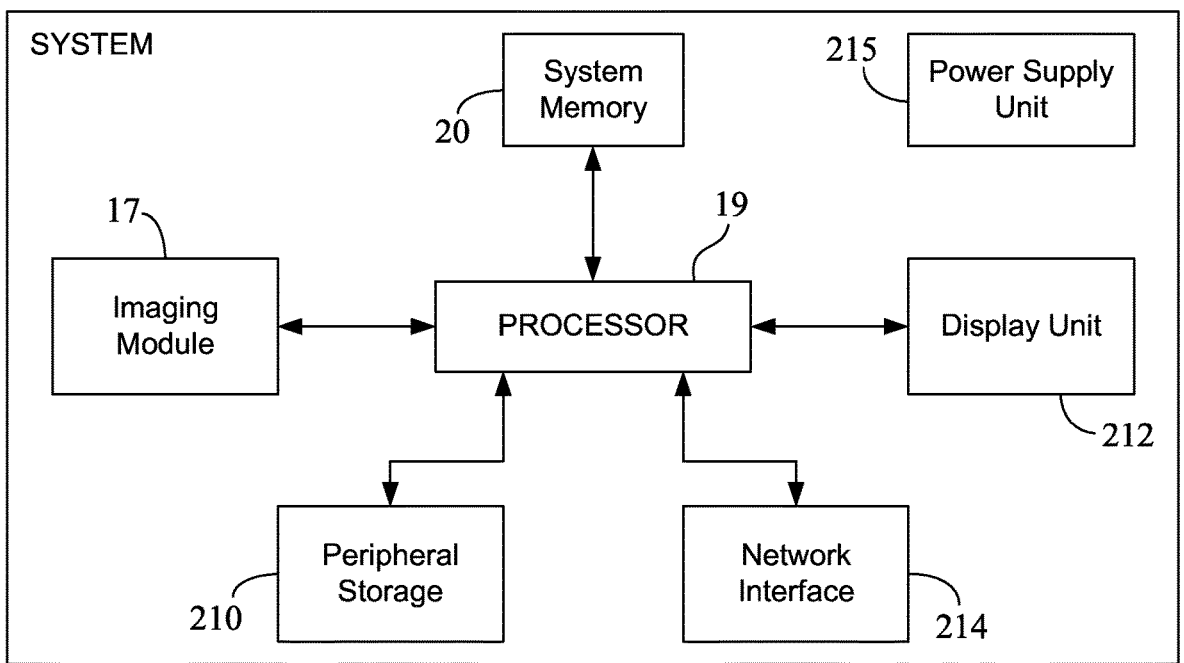
FIG. 10 depicts an overall layout of the system in FIGS. 1-2 according to one embodiment of the present disclosure.

FIG. 10 depicts an overall layout of the system 15 in FIGS. 1-2 according to one embodiment of the present disclosure. Hence, for ease of reference and discussion, the same reference numerals are used in FIGS. 1-2 and 10 for the common system components/units.

As discussed earlier, the imaging module 17 may include the desired hardware shown in the exemplary embodiments of FIG. 2, 5, 6 (or 8) to accomplish 2D/3D imaging and TOF measurements as per the inventive aspects of the present disclosure. The processor 19 may be configured to interface with a number of external devices. In one embodiment, the imaging module 17 may function as an input device that provides data inputs—in the form of processed pixel outputs such as, for example, the P1 and P2 values in FIG. 5—to the processor 19 for further processing. The processor 19 may also receive inputs from other input devices (not shown) that may be part of the system 15. Some examples of such input devices include a computer keyboard, a touchpad, a touchscreen, a joystick, a physical or virtual "clickable button," and/or a computer mouse/pointing device. In FIG. 10, the processor 19 is shown coupled to the system memory 20, a peripheral storage unit 210, one or more output devices 212, and a network interface unit 214. In FIG. 10, a display unit is shown as an output device 212. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a car's dash-cam or rearview camera system, an autonomous navigation system, or any other type of computing or data processing device. In various embodiments, all of the components shown in FIG. 10 may be housed within a single housing. Thus, the system 15 may be configured as a standalone system or in any other suitable form factor. In some embodiments, the system 15 may be configured as a client system rather than a server system.

In particular embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Unit (CPU).

As mentioned earlier, the system memory 20 may be any semiconductor-based storage system such as, for example, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium.

The peripheral storage unit 210, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 210 may include more complex storage devices/systems such as disk arrays (which may be in a suitable RAID (Redundant Array of Independent Disks) configuration) or Storage Area Networks (SANs), and the peripheral storage unit 210 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 212 may be an example of an output device. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 17, and the output device(s), such as the display unit 212, may be coupled to the processor 19 via an I/O or peripheral interface(s).

In one embodiment, the network interface 214 may communicate with the processor 19 to enable the system 15 to couple to a network (not shown). In another embodiment, the network interface 214 may be absent altogether. The network interface 214 may include any suitable devices, media and/or protocol content for connecting the system 15 to a network—whether wired or wireless. In various embodiments, the network may include Local Area Networks (LANs), Wide Area Networks (WANs), wired or wireless Ethernet, telecommunication networks, satellite links, or other suitable types of networks.

The system 15 may include an on-board power supply unit 215 to provide electrical power to various system components illustrated in FIG. 10. The power supply unit 215 may receive batteries or may be connectable to an AC electrical power outlet or an automobile-based power outlet. In one embodiment, the power supply unit 215 may convert solar energy or other renewable energy into electrical power.

In one embodiment, the imaging module 17 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 20 or a peripheral data storage unit such as a CD/DVD may store program code or software. The processor 19 and/or the pixel array control unit 46 (FIG. 2) in the imaging module 17 may be configured to execute the program code, whereby the device 15 may be operative to perform the 2D imaging (for example, grayscale image of a 3D object), TOF and range measurements, and generation of a 3D image of an object using the pixel-specific distance/range values, as discussed hereinbefore—such as, for example, the operations discussed earlier with reference to FIGS. 1-9. For example, in certain embodiments, upon execution of the program code, the processor 19 and/or the control unit 46 may suitably configure (or activate) relevant circuit components—such as the row decoder/driver 72 and the pixel column unit 76 in FIG. 5—to apply appropriate input signals, like the SH, RST, PG1-PG2, SEL signals, and so on, to the pixels 43 in the pixel array 42 to enable capture of the light from a returned laser pulse and to subsequently process the pixel outputs for pixel-specific P1 and P2 values needed for TOF and range measurements. The program code or software may be proprietary software or open source software which, upon execution by the appropriate processing entity—such as the processor 19 and/or the pixel array control unit 46—may enable the processing entity to process various pixel-specific ADC outputs (P1 and P2 values), determine range values, render the results in a variety of formats including, for example, displaying a 3D image of the distant object based on TOF-based range measurements. In certain embodiments, the pixel array control unit 46 in the imaging module 17 may perform some of the processing of pixel outputs before the pixel output data are sent to the processor 19 for further processing and display. In other embodiments, the processor 19 may also perform some or all of the functionality of the pixel array control unit 46, in which case, the pixel array control unit 46 may not be a part of the imaging module 17.

In the preceding description, for purposes of explanation and not limitation, specific details are set forth (such as particular architectures, waveforms, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 1-2) can represent conceptual views of illustrative circuitry or other functional units embodying the principles of the technology. Similarly, it will be appreciated that the flowchart in FIG. 4 represents various processes which may be substantially performed by a processor (e.g., the processor 19 in FIG. 10 and/or the pixel array control unit 46 in FIG. 2). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-9 also may be provided by such a processor, in the hardware and/or software.

When certain inventive aspects require software-based processing, such software or program code may reside in a computer-readable data storage medium. As noted earlier, such data storage medium may be part of the peripheral storage 210, or may be part of the system memory 20 or any internal memory (not shown) of the image sensor unit 24, or the processor's 19 internal memory (not shown). In one embodiment, the processor 19 and/or the pixel array control unit 46 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the imaging module 17 or the system 15 comprising such an imaging module according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various 2D and 3D imaging functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which TOF technique is combined with analog amplitude modulation within each pixel in a pixel array. The pixel may be a two-tap pixel or a one-tap pixel. The pixel includes two photoelectron receiver circuits, each of which receives a respective analog modulating signal. The distribution of the received photoelectron charge between these two circuits is controlled by the difference (or ratio) of the two analog modulating voltages. The differential signals generated in this manner within the pixel are modulated in time domain for TOF measurement. Thus, the TOF information is added to the received light signal by the analog domain-based single-ended to differential converter inside the pixel itself. The TOF-based measurement of range and its resolution are controllable by changing the duration of modulation imparted through the modulating signals. As a result, an autonomous navigation system that uses an AM-based TOF image sensor as per teachings of the present disclosure may provide improved vision for drivers under difficult driving conditions such as, for example, low light, fog, bad weather, strong ambient light, and so on. This pixel-based approach to provide analog amplitude modulation to control charge distribution within the pixel may be used in non-TOF systems as well.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method comprising:
projecting a laser pulse onto a three-dimensional (3D) object;
applying a first analog modulating signal to a first photoelectron receiver and a second analog modulating signal to a second photoelectron receiver in a pixel, and wherein the second analog modulating signal is an inverse of the first analog modulating signal;
detecting a returned pulse using the first and the second photoelectron receivers, wherein the returned pulse is the projected pulse reflected from the 3D object;
generating a pair of signal values in response to photoelectron receiver-specific detections of the returned pulse, wherein the pair of signal values includes a first signal value and a second signal value, and wherein each of the first and the second signal values is based on modulation received from a respective one of the first and the second analog modulating signals; and
determining a Time of Flight (TOF) value of the returned pulse using a ratio of the first signal value to a total of the first and the second signal values.

2. The method of claim 1, wherein the first photoelectron receiver includes a first photogate and the second photoelectron receiver includes a second photogate, and wherein the first analog modulating signal is applied to the first photogate and the second analog modulating signal is applied to the second photogate.

3. The method of claim 1, further comprising:
further applying a shutter signal to the pixel, wherein the first and the second analog modulating signals are applied substantially simultaneously with the shutter signal; and detecting the returned pulse using the first and the second photoelectron receivers while the shutter signal as well as the first and the second analog modulating signals are active.

4. The method of claim 3, wherein the shutter signal is applied a pre-determined time period after projecting the laser pulse.

5. The method of claim 1, further comprising:
determining a distance to the 3D object based on the TOF value.

6. The method of claim 1, wherein projecting the laser pulse includes:
projecting the laser pulse using a light source that is one of the following:
a laser light source;
a light source that produces light in a visible spectrum;
a light source that produces light in a non-visible spectrum;
a monochromatic illumination source;
an Infrared (IR) laser;
an X-Y addressable light source;
a point source with two-dimensional (2D) scanning capability;
a sheet source with one-dimensional (1D) scanning capability; and
a diffused laser.

7. The method of claim 1, wherein the pixel is a two-tap pixel, and wherein generating the pair of signal values includes:
obtaining from the pixel a first pixel-specific output substantially simultaneously with a second pixel-specific output after detection of the returned pulse, wherein the first pixel-specific output is amplitude modulated by the first analog modulating signal and the second pixel-specific output is amplitude modulated by the second analog modulating signal;
sampling the first and the second pixel-specific outputs substantially simultaneously using an Analog-to-Digital Converter (ADC) unit; and
based on the sampling, generating the first signal value corresponding to the first pixel-specific output and the second signal value corresponding to the second pixel-specific output substantially in parallel using the ADC unit.

8. The method of claim 1, wherein the pixel is a one-tap pixel, and wherein generating the pair of signal values includes:
obtaining from the pixel a first pixel-specific output followed by a second pixel-specific output after detection of the returned pulse, wherein the first pixel-specific output is amplitude modulated by the first analog modulating signal and the second pixel-specific output is amplitude modulated by the second analog modulating signal;
sampling the first and the second pixel-specific outputs using an Analog-to-Digital Converter (ADC) unit; and
based on the sampling, generating the first signal value corresponding to the first pixel-specific output and the second signal value corresponding to the second pixel-specific output using the ADC unit.

9. The method of claim 1, wherein the pixel is a one-tap pixel, and wherein generating the pair of signal values includes:
obtaining from the pixel a first pixel-specific output followed by a second pixel-specific output after detection of the returned pulse, wherein the first pixel-specific output is amplitude modulated by the first analog modulating signal and the second pixel-specific output is amplitude modulated by the second analog modulating signal;

first sampling the first pixel-specific output using an Analog-to-Digital Converter (ADC) unit;

based on the first sampling, generating the first signal value using the ADC unit;

second sampling a total of the first and the second pixel-specific outputs using the ADC unit; and based on the second sampling, generating the total of the first and the second signal values using the ADC unit.

10. The method of claim 1, wherein the first and the second analog modulating signals are time-varying.

* * * * *